United States Patent
Han et al.

(10) Patent No.: US 10,790,083 B2
(45) Date of Patent: Sep. 29, 2020

(54) WIRELESS CHARGER HAVING ELECTROMAGNETIC SHIELDING FUNCTION

(71) Applicants: HYUNDAI MOTOR COMPANY, Seoul (KR); KIA MOTORS CORPORATION, Seoul (KR)

(72) Inventors: Jang Soon Han, Yongin-si (KR); Seong Jun Mun, Seoul (KR); Cheol-Seung Choi, Ansan-si (KR); Jung-Gun Byun, Suwon-si (KR); Deog-Soo Kang, Hwaseong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 77 days.

(21) Appl. No.: 16/163,244

(22) Filed: Oct. 17, 2018

(65) Prior Publication Data

US 2019/0392984 A1 Dec. 26, 2019

(30) Foreign Application Priority Data

Jun. 20, 2018 (KR) .................. 10-2018-0070946

(51) Int. Cl.
| | | |
|---|---|---|
| *H02J 7/00* | (2006.01) | |
| *H01F 27/36* | (2006.01) | |
| *H02J 7/02* | (2016.01) | |
| *H02J 50/70* | (2016.01) | |
| *H01F 27/28* | (2006.01) | |
| *H02J 50/12* | (2016.01) | |
| *H01F 38/14* | (2006.01) | |

(52) U.S. Cl.
CPC ....... *H01F 27/362* (2013.01); *H01F 27/2885* (2013.01); *H01F 38/14* (2013.01); *H02J 7/025* (2013.01); *H02J 50/12* (2016.02); *H02J 50/70* (2016.02)

(58) Field of Classification Search
USPC .................... 320/106, 107, 108, 110, 132
See application file for complete search history.

(56) References Cited

U.S. PATENT DOCUMENTS

| | | | |
|---|---|---|---|
| 8,655,272 B2 | 2/2014 | Saunamaki | |
| 9,018,904 B2 | 4/2015 | Seyerle et al. | |
| 9,899,147 B2* | 2/2018 | Leem | H01F 27/2885 |
| 2014/0042820 A1 | 2/2014 | Park et al. | |
| 2016/0284465 A1* | 9/2016 | Maniktala | H01F 38/14 |

(Continued)

FOREIGN PATENT DOCUMENTS

| | | |
|---|---|---|
| JP | 2014197929 | 10/2014 |
| JP | 2015213411 | 11/2015 |

(Continued)

*Primary Examiner* — Brian Ngo
(74) *Attorney, Agent, or Firm* — Lempia Summerfield Katz LLC

(57) ABSTRACT

A wireless charger has an electromagnetic shielding function to efficiently shield electromagnetic waves generated in a transmitting coil of the wireless charger. The wireless charger includes a transmitting coil generating a magnetic field by a high frequency signal. The wireless charger further includes at least two electromagnetic wave shielding filters located on the transmitting coil and shielding electromagnetic waves generated in the transmitting coil.

6 Claims, 25 Drawing Sheets

(56) References Cited

U.S. PATENT DOCUMENTS

| | | | |
|---|---|---|---|
| 2017/0070100 A1* | 3/2017 | Su | H02J 50/12 |
| 2017/0106759 A1 | 4/2017 | Yamakawa et al. | |
| 2017/0141615 A1 | 5/2017 | Moon et al. | |
| 2018/0069434 A1 | 3/2018 | Hasegawa | |
| 2018/0090974 A1 | 3/2018 | Elkayam et al. | |
| 2019/0081517 A1* | 3/2019 | Graham | H02J 50/60 |
| 2019/0272943 A1* | 9/2019 | Leem | H02J 7/02 |

FOREIGN PATENT DOCUMENTS

| | | |
|---|---|---|
| JP | 2018042306 | 3/2018 |
| KR | 20120082769 | 7/2012 |
| KR | 20160090420 | 8/2016 |
| KR | 20170009683 | 1/2017 |
| KR | 20170088184 | 8/2017 |

* cited by examiner

WIRELESS CHARGER HAVING ELECTROMAGNETIC SHIELDING FUNCTION

CROSS-REFERENCE TO RELATED APPLICATION

This application is based on and claims the benefit of priority to Korean Patent Application No. 10-2018-0070946, filed on Jun. 20, 2018, in the Korean Intellectual Property Office, the disclosure of which is incorporated herein in its entirety by reference.

TECHNICAL FIELD

The present disclosure relates to a wireless charger having an electromagnetic shielding function.

BACKGROUND

Wireless power transmission technology has mainly been used in the field of smartphones. Recently, it has been gradually expanded to wearable devices, Internet of Things (IoT), electric vehicle charging stations, and the like. As transmitted power increases from low output to high output, there is growing concern about the emission of electromagnetic waves. In these examples, the electromagnetic waves include electromagnetic interference (EMI) noise, electromagnetic compatibility (EMC) noise, and the like, excluding signals to be transmitted.

In order to transmit power wirelessly, a transmitting circuit for generating high output and high frequency power, a coil for transmitting the same, and a receiving circuit are required. Since the transmitting circuit generating the power mostly uses square waves, harmonic signals other than the power transmission frequency may be conducted or radiated through a wire. Alternatively, the harmonic signals may be directly emitted to the outside through the power transmitting coil.

Such harmonic signals must be reduced since they may cause malfunction of components in the circuit or interference with other devices around a wireless power transmitter.

The problems of the prior art have been described above. However, the recognition of such problems to be solved would not be obvious to those having ordinary skill in the art to which the present disclosure pertains.

SUMMARY

The present disclosure is directed to solving the above-mentioned problems occurring in the prior art while advantages achieved by the prior art are maintained intact.

Since some of the devices around a wireless power transmitter are sensitive to the electromagnetic waves, strict limits on electromagnetic wave intensity must be imposed on power signals other than the power transmission frequency. To use a wireless power transmitter, such as a wireless charger in conjunction with such devices sensitive to the electromagnetic waves, electromagnetic wave intensity limits must be maintained. An aspect of the present disclosure provides a wireless charger having at least two electromagnetic wave shielding filters mounted in specific locations on a transmitting coil of the wireless charger, thereby efficiently shielding electromagnetic waves generated in the transmitting coil. The present disclosure is directed to a technology for efficiently shielding electromagnetic waves generated in a transmitting coil of a wireless charger using an electromagnetic wave shielding filter.

The object of the present disclosure is not limited to the foregoing object, and any other objects and advantages not mentioned herein will be clearly understood from the following description. The present inventive concept will be more clearly understood from embodiments of the present disclosure. In addition, it will be apparent that the objects and advantages of the present disclosure can be achieved by elements claimed in the claims and a combination thereof.

According to an aspect of the present disclosure, a wireless charger having an electromagnetic shielding function may include a transmitting coil generating a magnetic field by a high frequency signal. The wireless charger may further include at least two electromagnetic wave shielding filters located on the transmitting coil and shielding electromagnetic waves generated in the transmitting coil.

The electromagnetic wave shielding filters may be spaced apart from the transmitting coil while having a reference height (for example, 1 mm, 3 mm, 5 mm, 10 mm, or the like) above the transmitting coil, and be located parallel to the transmitting coil.

The transmitting coil may include a single transmitting coil. When a center point of each electromagnetic wave shielding filter is the foot of a perpendicular, the perpendicular passing through the center point may intersect the transmitting coil.

BRIEF DESCRIPTION OF THE DRAWINGS

The above and other objects, features and advantages of the present disclosure will be more apparent from the following detailed description taken in conjunction with the accompanying drawings:

FIGS. 6A-6I illustrate examples of structures of a wireless charger having an electromagnetic shielding function according to another embodiment of the present disclosure.

DETAILED DESCRIPTION

Figure 1:
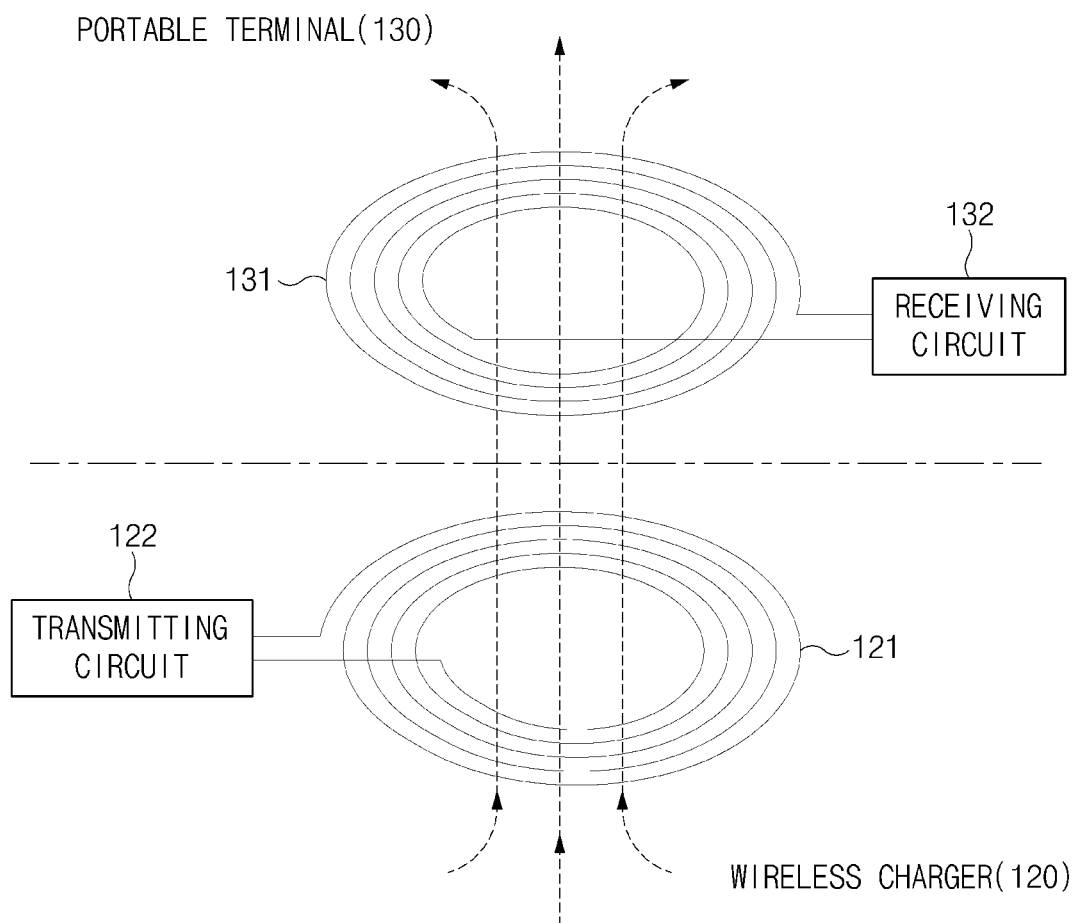
FIG. 1 illustrates the structure of a wireless charging system having a wireless charger according to an embodiment of the present disclosure.

Hereinafter, embodiments of the present disclosure are described in detail with reference to the accompanying drawings. In the drawings, the same reference numerals are used throughout to designate the same or equivalent elements. In addition, a detailed description of well-known techniques associated with the present disclosure is ruled out in order to avoid unnecessarily obscuring the gist of the present disclosure.

Terms such as first, second, A, B, (a), and (b) may be used to describe the elements in embodiments of the present disclosure. These terms are only used to distinguish one element from another element. The intrinsic features, sequence or order, and the like of the corresponding elements are not limited by the terms. Unless otherwise defined, all terms used herein, including technical or scientific terms, have the same meanings as those generally understood by those having ordinary skill in the art to which the present disclosure pertains. Such terms as those defined in a generally used dictionary are to be interpreted as having meanings equal to the contextual meanings in the relevant field of art. Such terms are not to be interpreted as having ideal or excessively formal meanings unless clearly defined as having such in the present application.

FIG. 1 illustrates the structure of a wireless charging system 100 having a wireless charger 120 according to an embodiment of the present disclosure.

As illustrated in FIG. 1, the wireless charging system 100 having the wireless charger 120 may transmit power wirelessly using magnetic induction or magnetic resonance formed between a transmitting coil 121 of the wireless charger 120 and a receiving coil 131 of a portable terminal 130. The wireless charger 120 may be a wireless power transmitter. The portable terminal 130 may be a wireless power receiver.

A transmitting circuit 122 of the wireless charger 120 may generate a high frequency signal required for wireless transmission of power. When the generated high frequency signal is input to the transmitting coil 121, a magnetic field may be formed. When the magnetic field generated in the transmitting coil 121 passes through the receiving coil 131 of the portable terminal 133, an induced current may be generated. The induced current may be rectified in a receiving circuit 132. The induced current may then be stored in a battery of the portable terminal.

The transmitting coil 121 and the receiving coil 131 may be formed of a conducting wire of high conductivity. When energy to be transmitted is in the form of a magnetic field, a solenoid type coil or a helical type coil may be mainly used.

To increase power transmission efficiency of the wireless charging system, a circuit for impedance matching may be additionally connected to an input terminal of the transmitting coil 121 or to an output terminal of the receiving coil 131.

Figure 2:
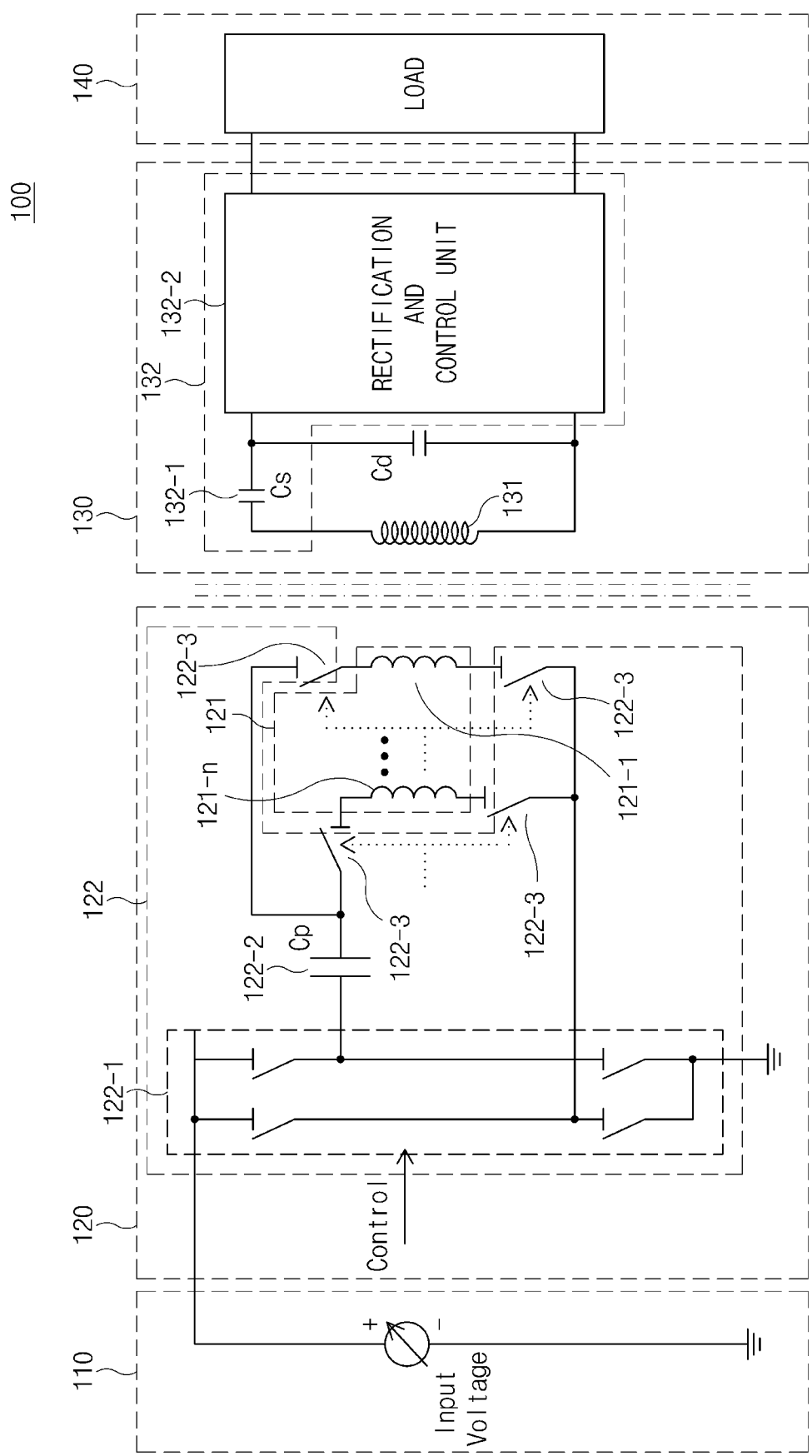
FIG. 2 illustrates the configuration of a wireless charging system having a wireless charger according to an embodiment of the present disclosure.

FIG. 2 illustrates the configuration of a wireless charging system 100 having a wireless charger 120 according to an embodiment of the present disclosure. In this example, a wireless charging system 100 including a plurality of transmitting coils are illustrated. In another example, the wireless charger 120 may also be applied to a wireless charging system 100 including a single transmitting coil.

As illustrated in FIG. 2, a wireless charging system 100 including a wireless charger 120 according to an embodiment of the present disclosure, may be a general system for wirelessly transmitting power by selectively using a transmitting coil 121, which may be a plurality of transmitting coils 121-1 to 121-n. In this example, the system may include the wireless charger 120 receiving power from a power source 110 and transmitting the power wirelessly, and a portable terminal 130 supplying the power from the wireless charger 120 to a load 140. The load 140 may include a battery of the portable terminal 130.

The wireless charger 120 may include: a transmitting circuit 122 including a power control circuit 122-1 for controlling the power supplied to the transmitting coils 121-1 to 121-n, a primary capacitor 122-2 for constructing a resonance circuit, and a plurality of switches 122-3 for selectively supplying a high frequency signal to one of the transmitting coils 121-1 to 121-n; and the transmitting coils 121-1 to 121-n. In this example, the transmitting circuit 122 may collectively supply the high frequency signal to all of the transmitting coils 121-1 to 121-n.

The portable terminal 130 may include a receiving coil 131 for receiving the power from the transmitting coil 121. The portable terminal 130 may further include a receiving circuit 132 including a secondary capacitor 132-1 for constructing a resonance circuit and a rectification and control unit 132-2 for rectifying and controlling the received power. In this example, the transmitting coil 121 and the receiving coil 131 may include an induction coil and a resonance coil but will be collectively referred to as a transmitting coil and a receiving coil.

The power generated by the power source 110 may be transmitted to the wireless charger 120. The power transmitted to the wireless charger 120 may be converted into a transmission resonance frequency and be transmitted to the portable terminal 130 having the same resonance frequency as the transmission resonance frequency. The power transmitted to the wireless charger 120 may be supplied to one of the plurality of transmitting coils 121-1 to 121-n through the power control circuit 122-1. In the receiving coil 131 of the portable terminal 130, the received resonance frequency power may be induced in the form of alternating current (AC). The rectification and control unit 132-2 may rectify the induced power and transmit the rectified power to the load 140.

The transmitting coil 121 and the receiving coil 131 may be a solenoid type coil, a helical type coil, or the like. In addition, the transmitting coil 121 may include two or more transmitting coils, and one of the transmitting coils 121-1 to 121-n may be selected to transmit the power to the receiving coil 131 by taking into consideration the most advantageous location for impedance matching depending on the location of the portable terminal 130 in the vicinity. By charging the portable terminal 130 at the most advantageous location for the impedance matching between the transmitting coils 121-1 to 121-n and the receiving coil 131, the power transmission efficiency between the wireless charger 120 and the portable terminal 130 may be significantly improved.

Figure 3:
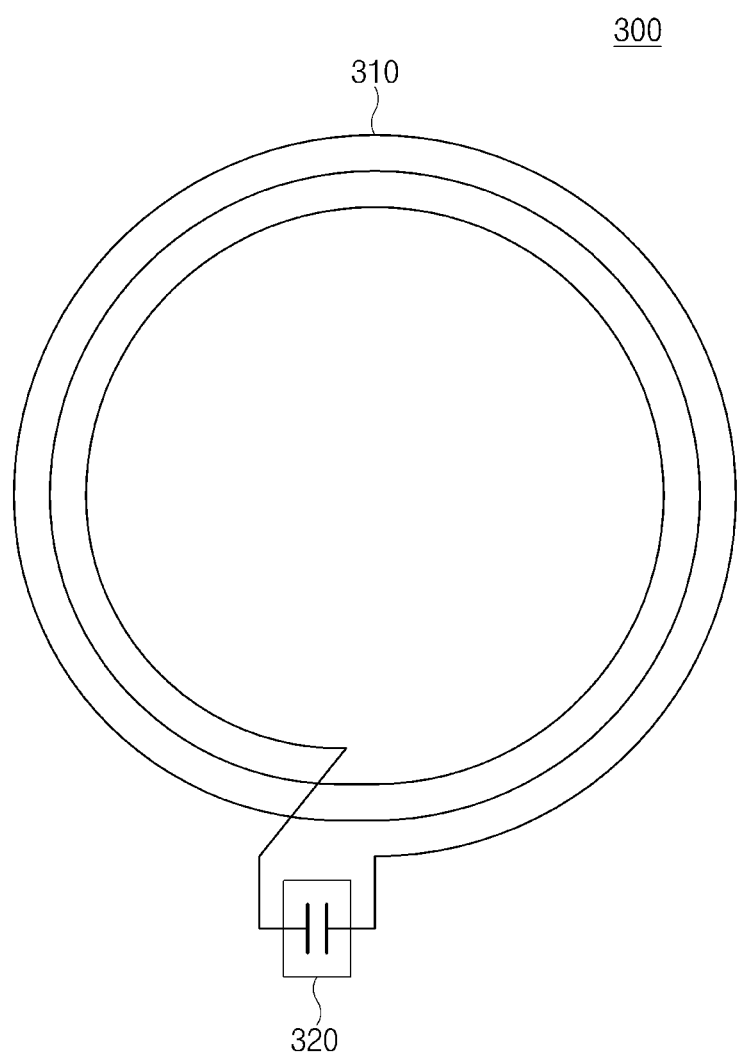
FIG. 3 illustrates the structure of an electromagnetic wave shielding filter used in a wireless charger according to an embodiment of the present disclosure.

FIG. 3 illustrates the structure of an electromagnetic wave shielding filter 300 used in a wireless charger 120 according to an embodiment of the present disclosure.

As illustrated in FIG. 3, the electromagnetic wave shielding filter 300 used in the wireless charger 120 may include a coil (shielded coil) 310 formed in a closed loop, and a capacitor 320 connecting both ends (a start point and an end point) of the coil 310. In this example, the number of turns of the coil 310 may vary according to the specification (charging voltage, etc.) of the wireless charger 120. The coil 310 may be enclosed by an insulator such as wire sheathing. The coil 310 may be provided in various shapes such as circular, elliptical, and polygonal shapes.

The closed loop-type coil 310 serving to shield a magnetic field may generate a reverse phase magnetic field (phase having a difference of 180 degrees) for canceling a leakage magnetic field generated in the transmitting coil of the wireless charger 120 so that the reverse phase may cancel (shield) the leakage magnetic field generated by the transmitting coil. In this example, the leakage magnetic field is generated in the vicinity of the transmitting coil when the current flows in the coil used for wireless power transmission. The leakage magnetic field may have a bad influence, for example, on a user's body or on peripheral electronic devices. Additionally, the cancellation of the leakage magnetic field ultimately indicates the reduction of electromagnetic waves.

The capacitor 320 connected to both ends of the closed loop may adjust a resonance frequency (resonance point) of the closed loop to control the phase and intensity of the current induced in the closed loop, allowing the reverse phase magnetic field to have the same intensity as that of the leakage magnetic field, thereby completely cancelling the leakage magnetic field. In this example, unlike a method for shielding the leakage magnetic field using a ferrite or a metal shield, the capacitor is used for shielding the leakage magnetic field, and thus a relatively small size and lightweight design may be implemented.

The inductance of the closed loop-type coil 310 may be 0.01 uH-100 uH and the capacitance of the capacitor 320 may be 10 pF-100 μF.

FIGS. 4A to 4F illustrate examples of structures of a wireless charger 120 having an electromagnetic shielding function according to an embodiment of the present disclosure. FIGS. 4A-4F also illustrate optimal locations of respective electromagnetic wave shielding filters 410 to 427 when the wireless charger 120 includes a single transmitting coil 12.

Hereinafter, the electromagnetic wave shielding filters 410 to 427 may be located at the same height with respect to the transmitting coil 12 and parallel to the transmitting coil 12, and the height may be within 10 mm. Additionally, each of the electromagnetic wave shielding filters 410 to 427 may have any shape as long as it has an inductance. Furthermore, the shape of each electromagnetic wave shielding filter is illustrated in a simplified form, and the structure thereof is the same as that illustrated in FIG. 3.

Figure 4A:
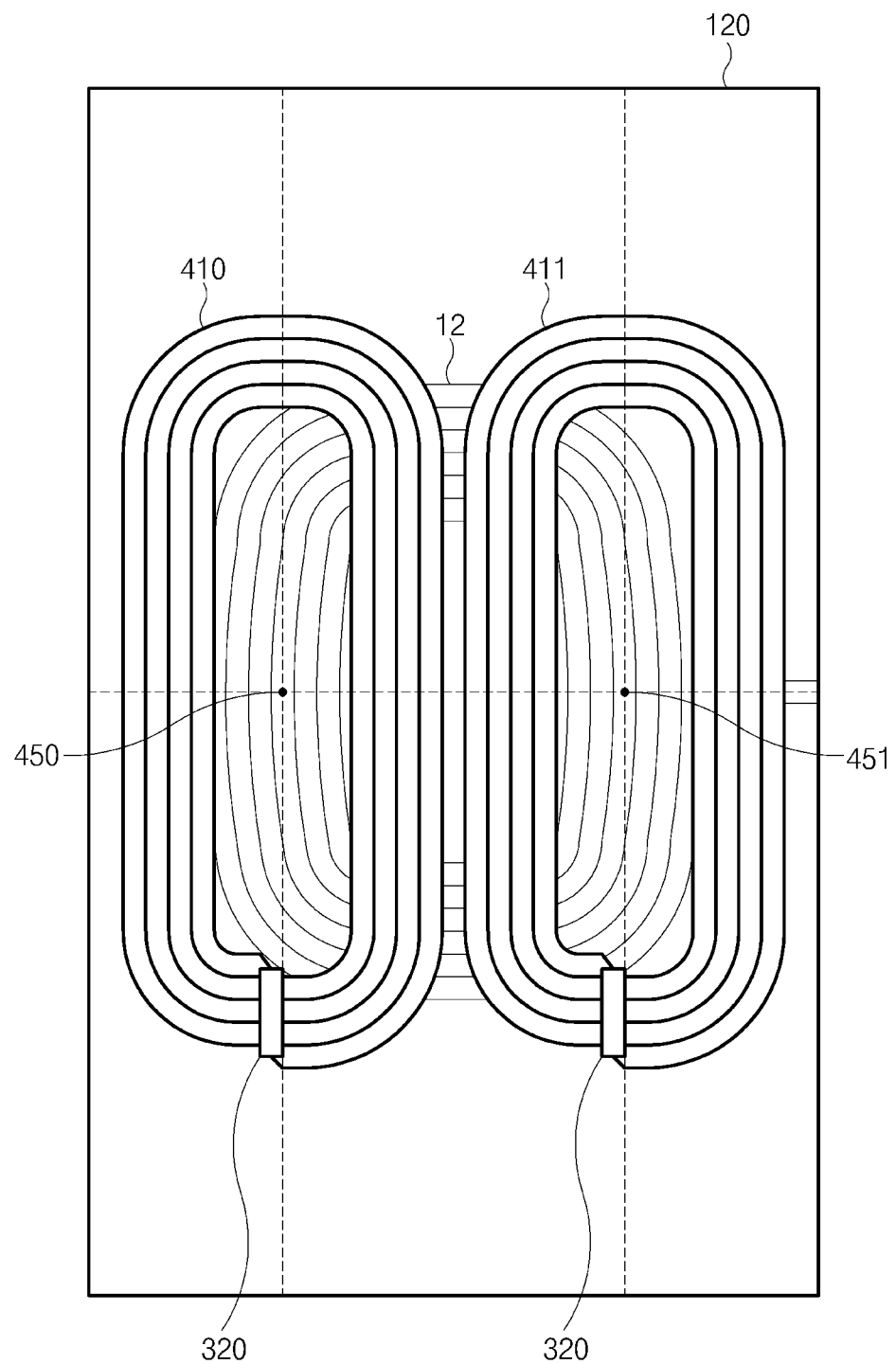
FIGS. 4A-4F illustrate examples of structures of a wireless charger having an electromagnetic shielding function according to an embodiment of the present disclosure.

FIG. 4A illustrates an example including a first electromagnetic wave shielding filter 410 and a second electromagnetic wave shielding filter 411. In this example, the first electromagnetic wave shielding filter 410 and the second electromagnetic wave shielding filter 411 may have the same structure (size, shape, thickness, and the like).

As illustrated in FIG. 4A, the first electromagnetic wave shielding filter 410 may be located on the left side of the transmitting coil 12. The second electromagnetic wave shielding filter 411 may be located on the right side of the transmitting coil 12. In this example, a center point 450 of the first electromagnetic wave shielding filter 410 and a center point 451 of the second electromagnetic wave shielding filter 411 may be located on the transmitting coil 12. In other words, the center point 450 of the first electromagnetic wave shielding filter 410 is the foot of a perpendicular. The perpendicular passing through the center point 450 intersects the transmitting coil 12. Likewise, the center point 451 of the second electromagnetic wave shielding filter 411 is the foot of a perpendicular. The perpendicular passing through the center point 451 intersects the transmitting coil 12.

Figure 4B:
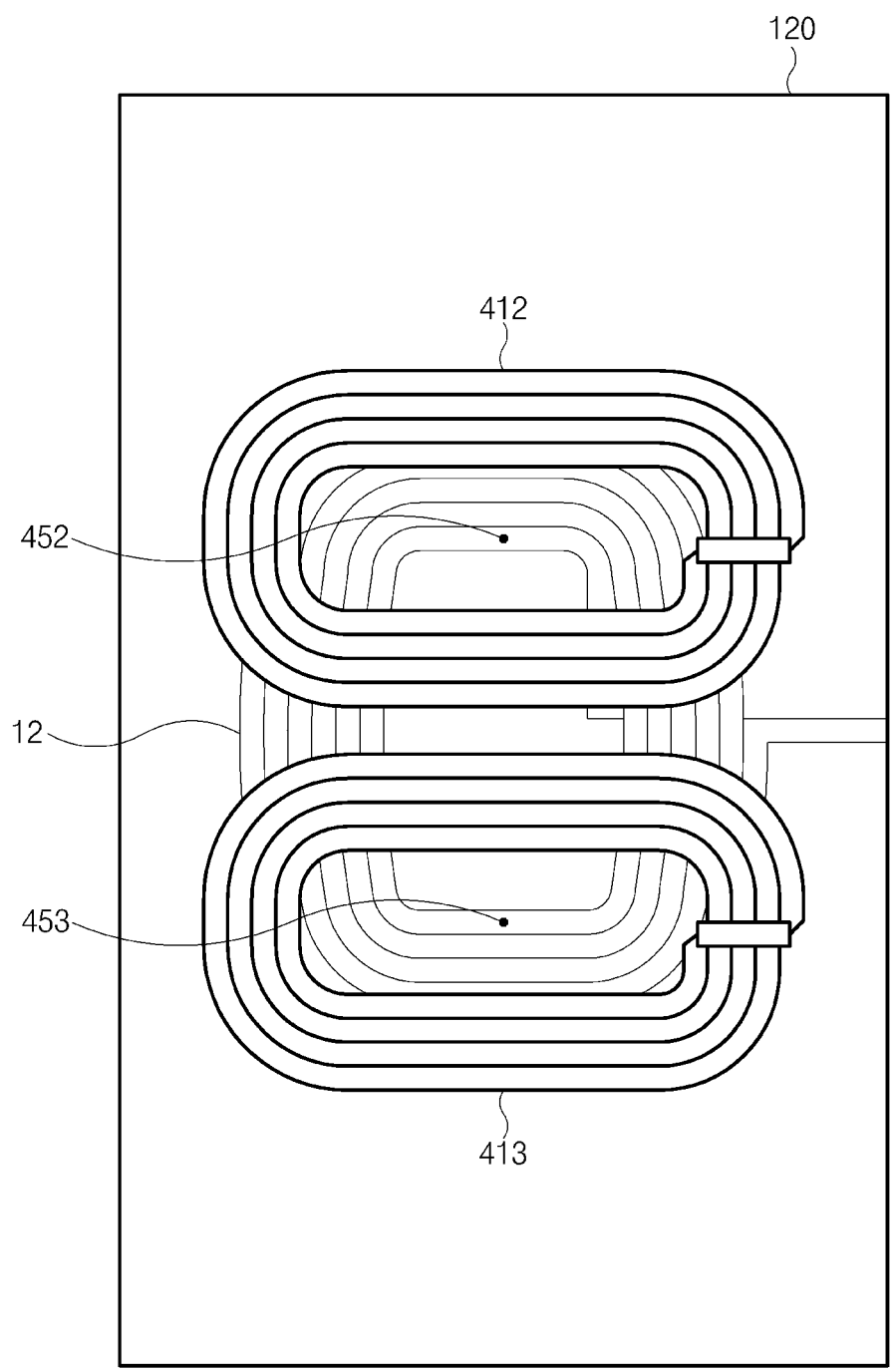

FIG. 4B illustrates an example including a first electromagnetic wave shielding filter 412 and a second electromagnetic wave shielding filter 413. In this example, the first electromagnetic wave shielding filter 412 and the second electromagnetic wave shielding filter 413 may have the same structure.

As illustrated in FIG. 4B, the first electromagnetic wave shielding filter 412 may be located on the upper end of the transmitting coil 12. The second electromagnetic wave shielding filter 413 may be located on the lower end of the transmitting coil 12. In this example, a center point 452 of the first electromagnetic wave shielding filter 412 and a center point 453 of the second electromagnetic wave shielding filter 413 may be located on the transmitting coil 12. In other words, the center point 452 of the first electromagnetic wave shielding filter 412 is the foot of a perpendicular, and the perpendicular passing through the center point 452 intersects the transmitting coil 12. Likewise, the center point 453 of the second electromagnetic wave shielding filter 413 is the foot of a perpendicular. The perpendicular passing through the center point 453 intersects the transmitting coil 12.

Figure 4C:
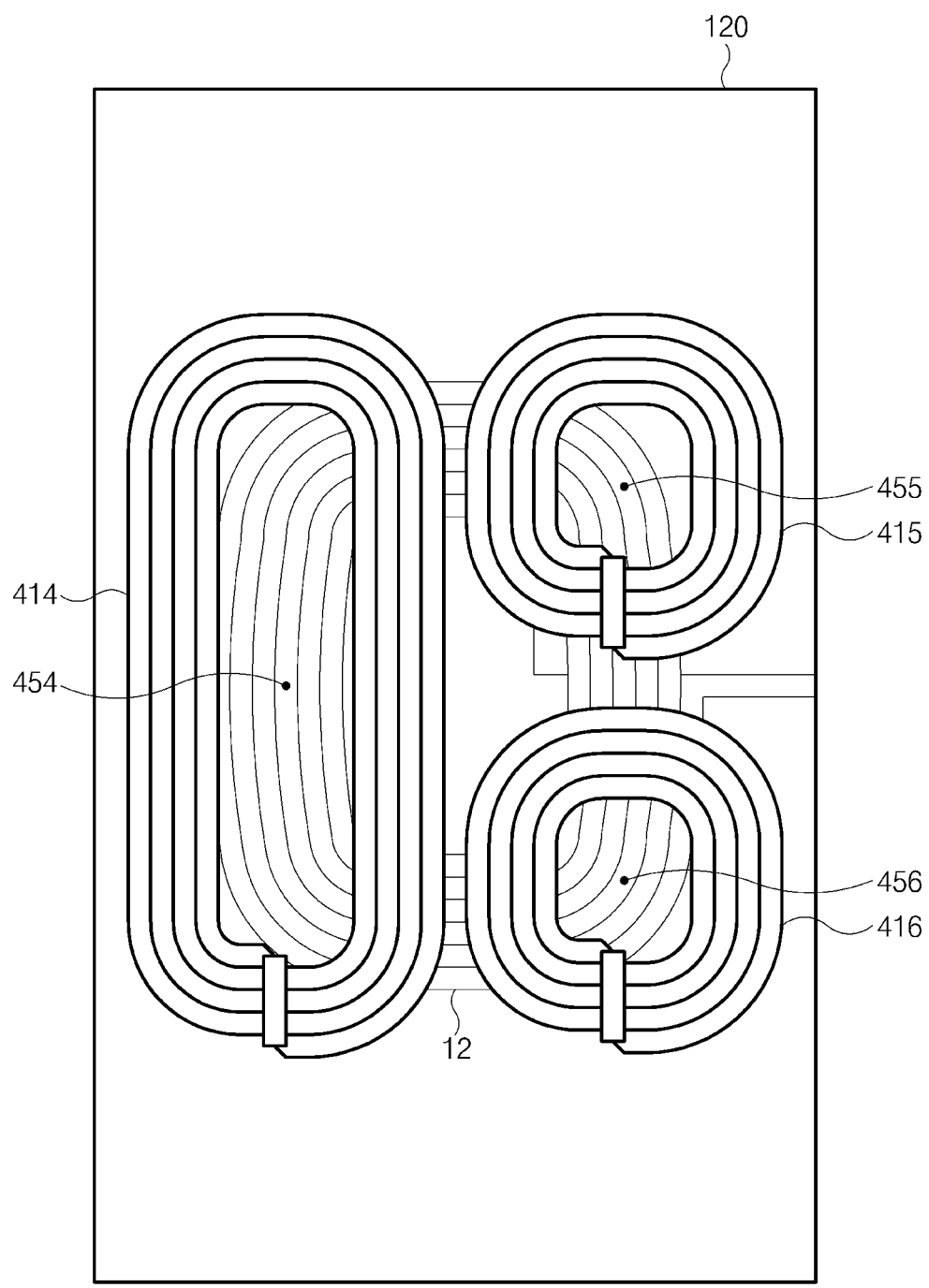

FIG. 4C illustrates an example including a first electromagnetic wave shielding filter 414, a second electromagnetic wave shielding filter 415, and a third electromagnetic wave shielding filter 416. In this example, the second electromagnetic wave shielding filter 415 and the third electromagnetic wave shielding filter 416 may have the same structure, but they may have a different structure from that of the first electromagnetic wave shielding filter 414.

As illustrated in FIG. 4C, the first electromagnetic wave shielding filter 414 may be located on the left side of the transmitting coil 12, the second electromagnetic wave shielding filter 415 may be located on the upper right side of the transmitting coil 12, and the third electromagnetic wave shielding filter 416 may be located on the lower right side of the transmitting coil 12. In this example, a center point 454 of the first electromagnetic wave shielding filter 414, a center point 455 of the second electromagnetic wave shielding filter 415, and a center point 456 of the third electromagnetic wave shielding filter 416 may be located on the transmitting coil 12. In other words, the center point 454 of the first electromagnetic wave shielding filter 414 is the foot of a perpendicular. The perpendicular passing through the center point 454 intersects the transmitting coil 12. Likewise, the center point 455 of the second electromagnetic wave shielding filter 415 is the foot of a perpendicular. The perpendicular passing through the center point 455 intersects the transmitting coil 12. In addition, the center point 456 of the third electromagnetic wave shielding filter 416 is the foot of a perpendicular. The perpendicular passing through the center point 456 intersects the transmitting coil 12.

Figure 4D:
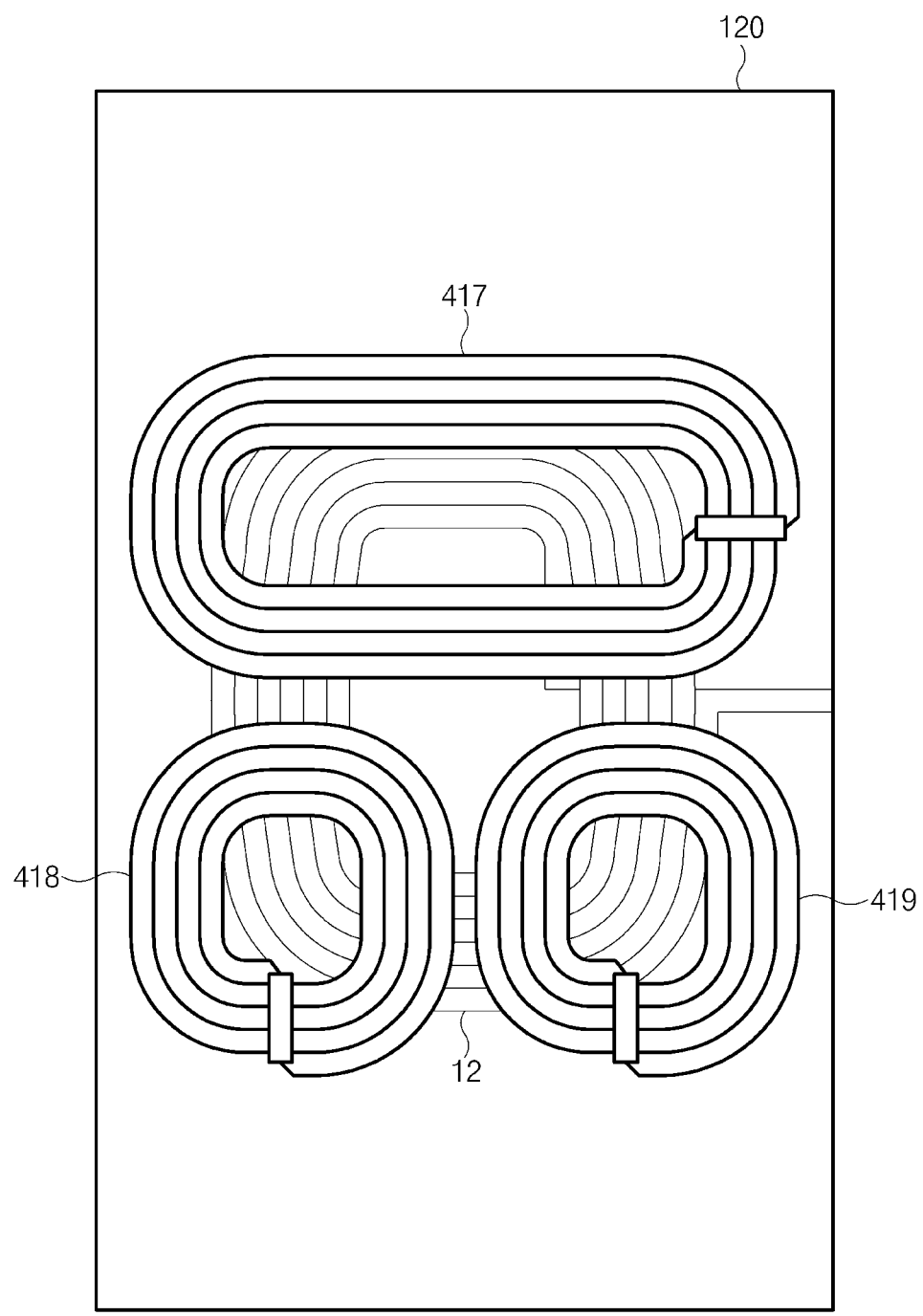

FIG. 4D illustrates an example including a first electromagnetic wave shielding filter 417, a second electromagnetic wave shielding filter 418, and a third electromagnetic wave shielding filter 419. In this example, the second electromagnetic wave shielding filter 418 and the third electromagnetic wave shielding filter 419 may have the same structure, but they may have a different structure from that of the first electromagnetic wave shielding filter 417.

As illustrated in FIG. 4D, the first electromagnetic wave shielding filter 417 may be located on the upper end of the transmitting coil 12. The second electromagnetic wave shielding filter 418 may be located on the lower left side of the transmitting coil 12 and the third electromagnetic wave shielding filter 419 may be located on the lower right side of the transmitting coil 12. In this example, a center point of the first electromagnetic wave shielding filter 417, a center point of the second electromagnetic wave shielding filter 418, and a center point of the third electromagnetic wave shielding filter 419 may be located on the transmitting coil 12.

Figure 4E:
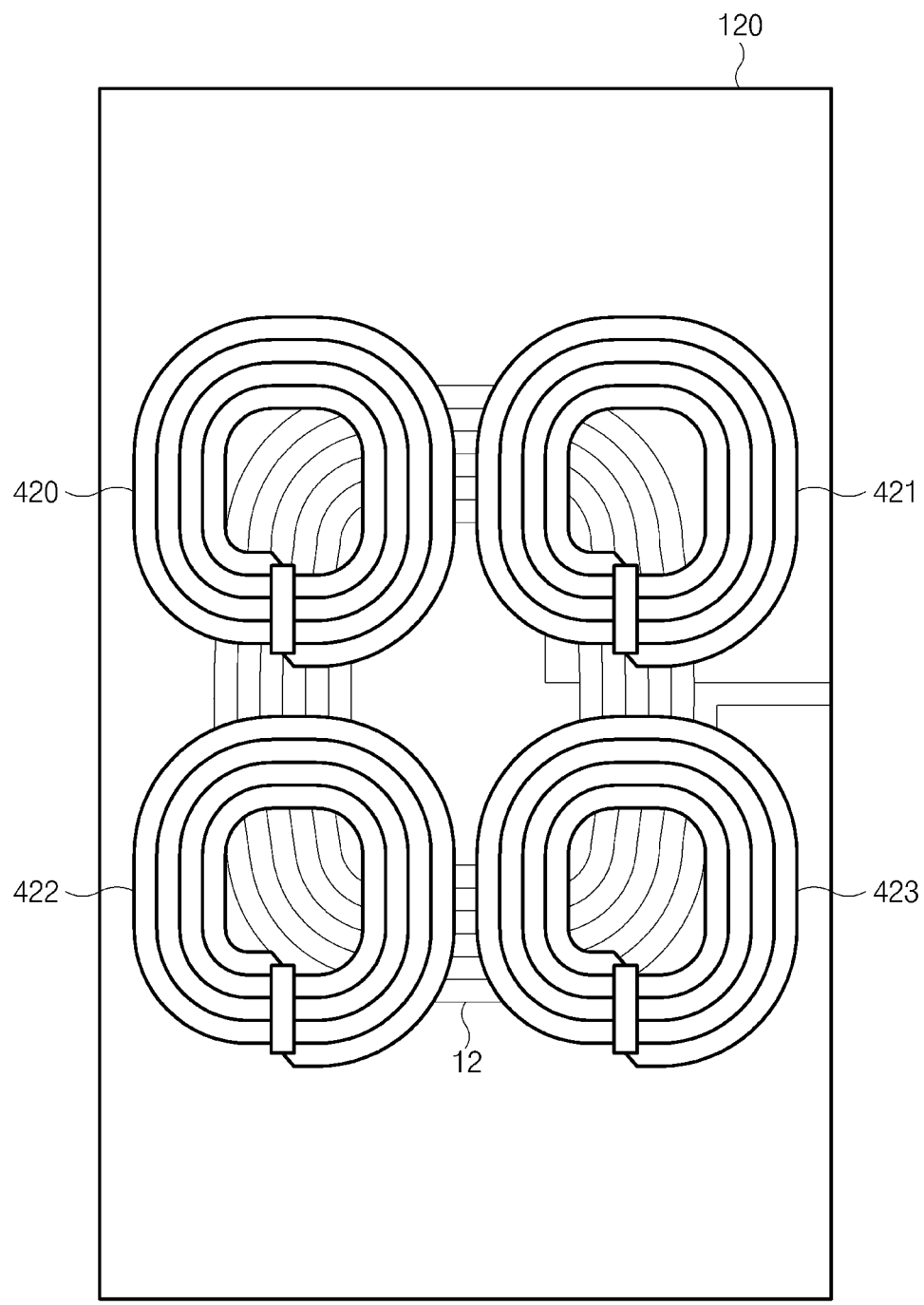

FIG. 4E illustrates an example including a first electromagnetic wave shielding filter 420, a second electromagnetic wave shielding filter 421, a third electromagnetic wave shielding filter 422, and a fourth electromagnetic wave shielding filter 423. In this example, the first electromagnetic wave shielding filter 420, the second electromagnetic wave shielding filter 421, the third electromagnetic wave shielding filter 422, and the fourth electromagnetic wave shielding filter 423 may have the same structure.

As illustrated in FIG. 4E, the first electromagnetic wave shielding filter 420 may be located on the upper left side of the transmitting coil 12 and the second electromagnetic wave shielding filter 421 may be located on the upper right side of the transmitting coil 12. The third electromagnetic wave shielding filter 422 may be located on the lower left side of the transmitting coil 12 and the fourth electromagnetic wave shielding filter 423 may be located on the lower right side of the transmitting coil 12. In this example, a center point of the first electromagnetic wave shielding filter 420, a center point of the second electromagnetic wave shielding filter 421, a center point of the third electromagnetic wave shielding filter 422, and a center point of the fourth electromagnetic wave shielding filter 423 may be located on the transmitting coil 12.

Figure 4F:
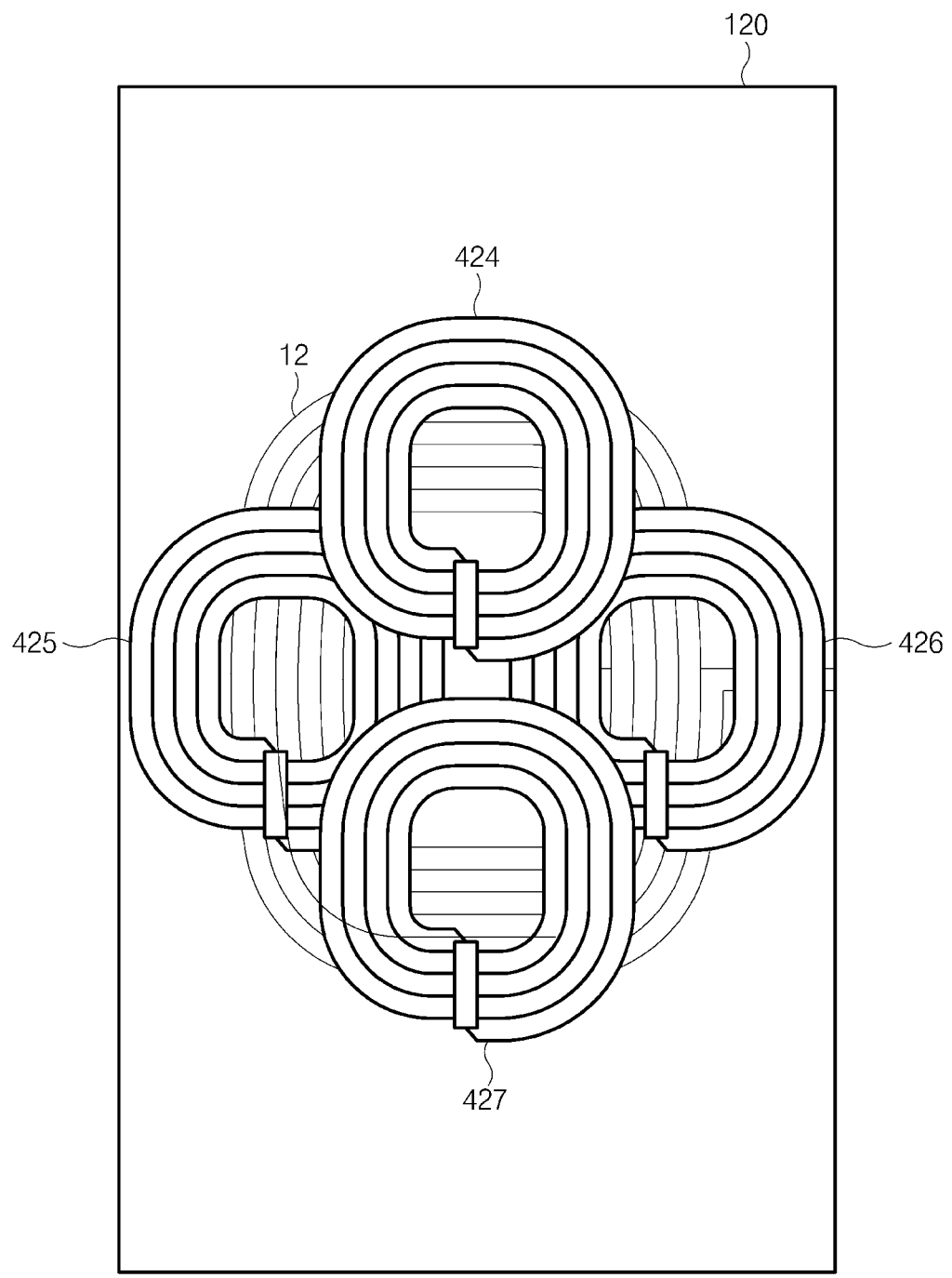

FIG. 4F illustrates an example including a first electromagnetic wave shielding filter 424, a second electromagnetic wave shielding filter 425, a third electromagnetic wave shielding filter 426, and a fourth electromagnetic wave shielding filter 427. In this example, the first electromagnetic wave shielding filter 424, the second electromagnetic wave shielding filter 425, the third electromagnetic wave shielding filter 426, and the fourth electromagnetic wave shielding filter 427 may have the same structure.

As illustrated in FIG. 4F, the first electromagnetic wave shielding filter 424 may be located on the upper end of the transmitting coil 12, the second electromagnetic wave shielding filter 425 may be located on the left side of the transmitting coil 12, the third electromagnetic wave shielding filter 426 may be located on the right side of the transmitting coil 12, and the fourth electromagnetic wave shielding filter 427 may be located on the lower end of the transmitting coil 12. In this example, a center point of the first electromagnetic wave shielding filter 424, a center point of the second electromagnetic wave shielding filter 425, a center point of the third electromagnetic wave shielding filter 426, and a center point of the fourth electromagnetic wave shielding filter 427 may be located on the transmitting coil 12.

FIGS. 5A-5G illustrate examples of structures of a wireless charger 120 having an electromagnetic shielding function according to another embodiment of the present disclosure. FIGS. 5A-5G also illustrate optimal locations of respective electromagnetic wave shielding filters 510 to 543 when the wireless charger 120 includes two transmitting coils 13 and 14.

Hereinafter, a first transmitting coil 13 and a second transmitting coil 14 may be located on the same plane. The electromagnetic wave shielding filters 510 to 543 may be located at the same height with respect to the first transmitting coil 13, and the height may be within 10 mm. In addition, each of the electromagnetic wave shielding filters 510 to 543 may have any shape as long as it has an inductance.

Figure 5A:
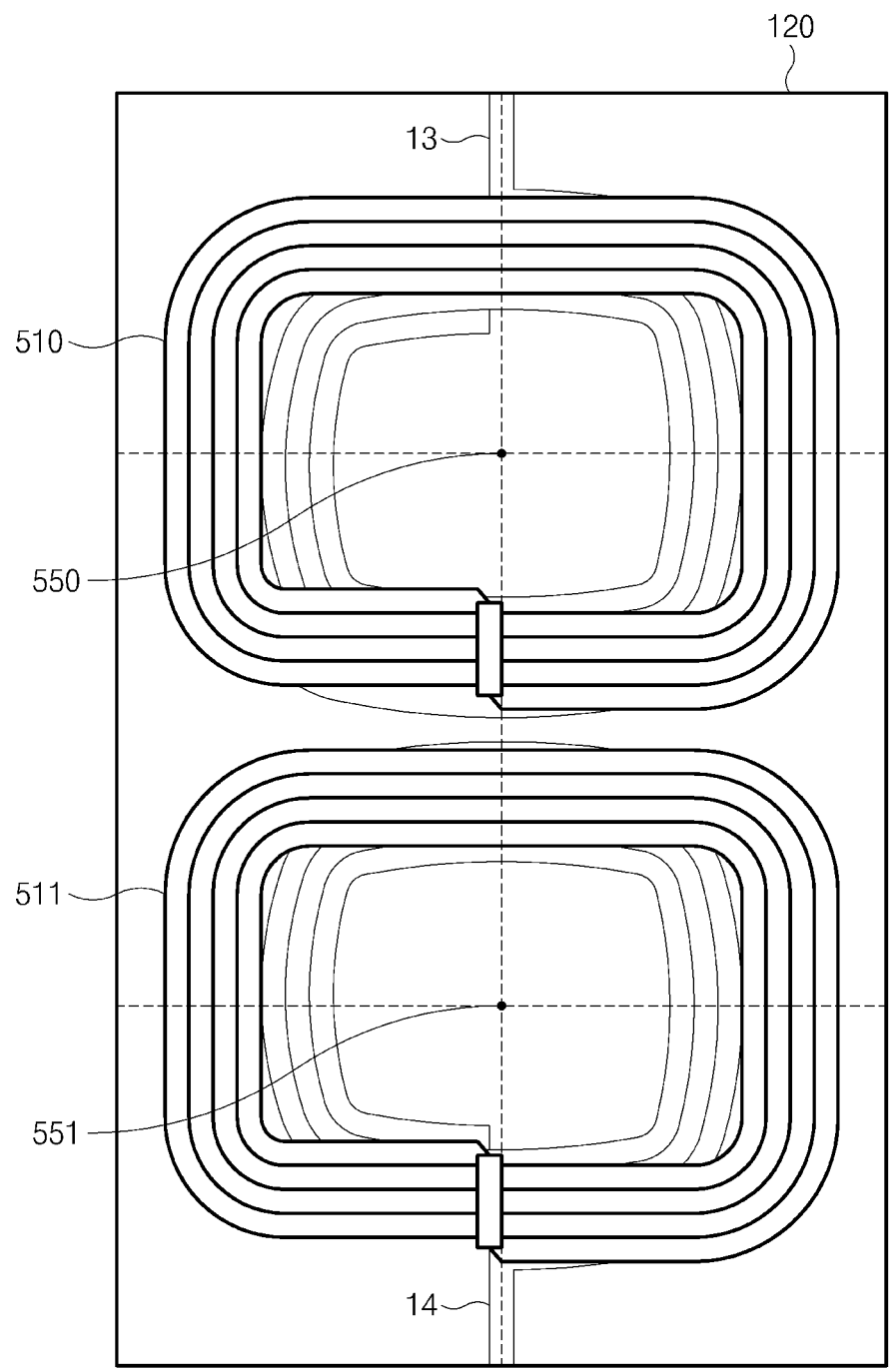
FIGS. 5A-5G illustrate examples of structures of a wireless charger having an electromagnetic shielding function according to another embodiment of the present disclosure.

FIG. 5A illustrates an example including a first electromagnetic wave shielding filter 510 and a second electromagnetic wave shielding filter 511. In this example, the first electromagnetic wave shielding filter 510 and the second electromagnetic wave shielding filter 511 may have the same structure.

As illustrated in FIG. 5A, the first electromagnetic wave shielding filter 510 may be located on the first transmitting coil 13 to be overlapped with each other. The second electromagnetic wave shielding filter 511 may be located on the second transmitting coil 14 to be overlapped with each other. In this example, a center point 550 of the first electromagnetic wave shielding filter 510 may not be located on the first transmitting coil 13. A center point 551 of the second electromagnetic wave shielding filter 511 may not be located on the second transmitting coil 14. In other words, the center point 550 of the first electromagnetic wave shielding filter 510 may be overlapped with that of the first transmitting coil 13. The center point 551 of the second electromagnetic wave shielding filter 511 may be overlapped with that of the second transmitting coil 14.

Figure 5B:
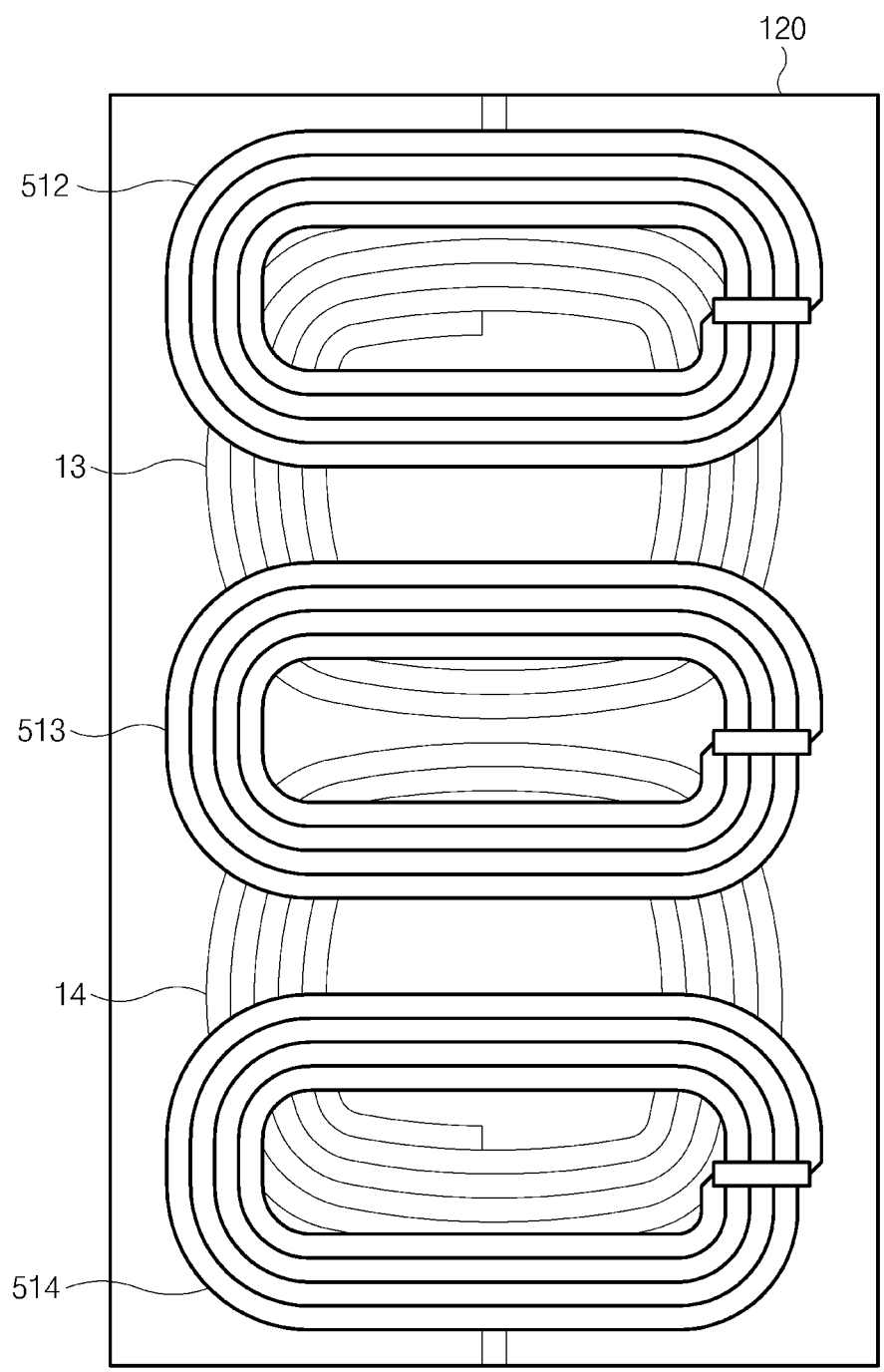

FIG. 5B illustrates an example including a first electromagnetic wave shielding filter 512, a second electromagnetic wave shielding filter 513, and a third electromagnetic wave shielding filter 514. In this example, the first electromagnetic wave shielding filter 512, the second electromagnetic wave shielding filter 513, and the third electromagnetic wave shielding filter 514 may have the same structure.

As illustrated in FIG. 5B, the first electromagnetic wave shielding filter 512 may be located on the upper end of the first transmitting coil 13. The second electromagnetic wave shielding filter 513 may be located on the first transmitting coil 13 and the second transmitting coil 14. The third electromagnetic wave shielding filter 514 may be located on the lower end of the second transmitting coil 14. In this example, a center point of the first electromagnetic wave shielding filter 512 may be located on the first transmitting coil 13. A center point of the second electromagnetic wave shielding filter 513 may be located on the first transmitting coil 13 or the second transmitting coil 14. A center point of the third electromagnetic wave shielding filter 514 may be located on the second transmitting coil 14.

Figure 5C:
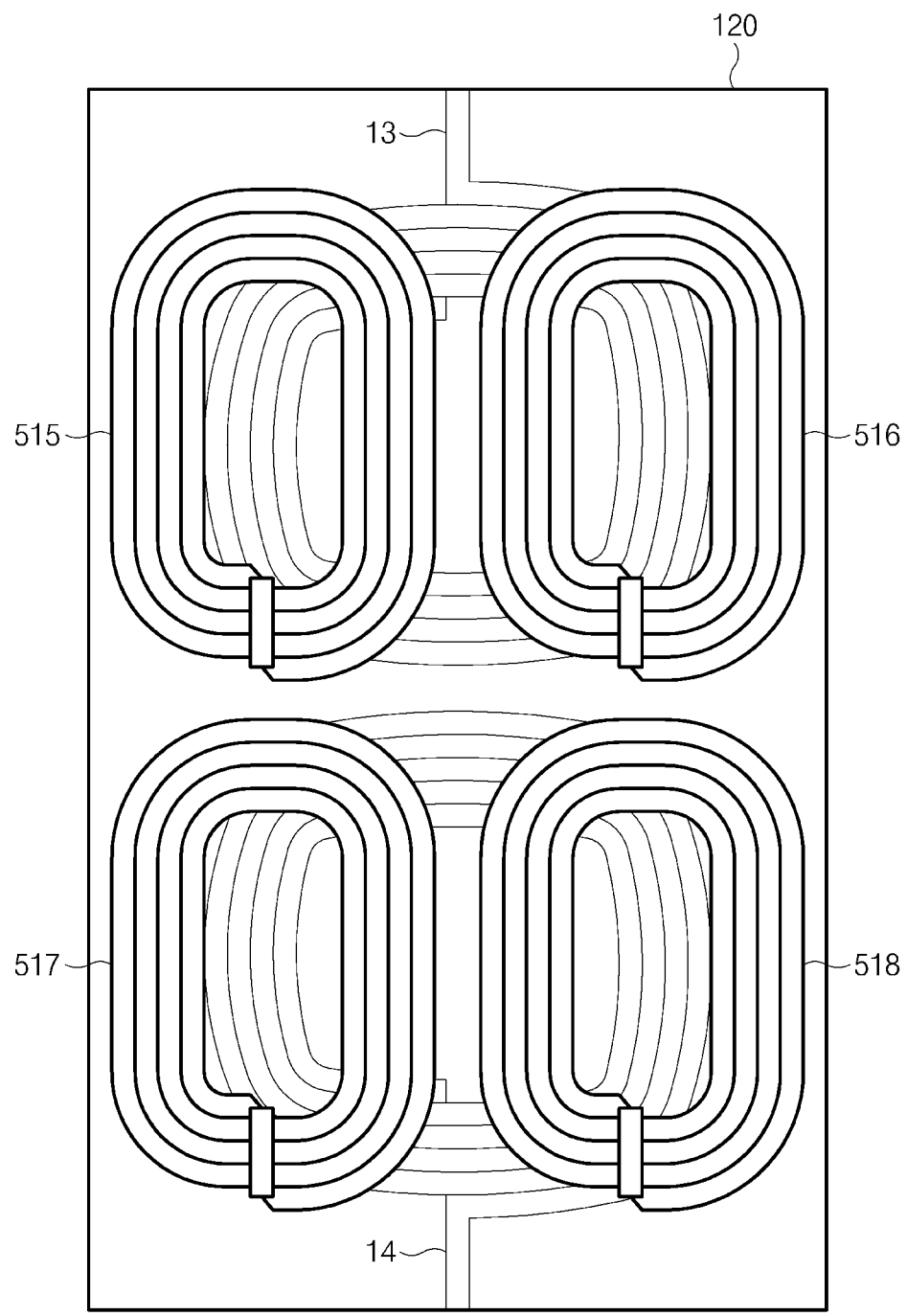

FIG. 5C illustrates an example including a first electromagnetic wave shielding filter 515, a second electromagnetic wave shielding filter 516, a third electromagnetic wave shielding filter 517, and a fourth electromagnetic wave shielding filter 518. In this example, the first electromagnetic wave shielding filter 515, the second electromagnetic wave shielding filter 516, the third electromagnetic wave shielding filter 517, and the fourth electromagnetic wave shielding filter 518 may have the same structure.

As illustrated in FIG. 5C, the first electromagnetic wave shielding filter 515 may be located on the left side of the first transmitting coil 13 and the second electromagnetic wave shielding filter 516 may be located on the right side of the first transmitting coil 13. The third electromagnetic wave shielding filter 517 may be located on the left side of the second transmitting coil 14 and the fourth electromagnetic wave shielding filter 518 may be located on the right side of the second transmitting coil 14. In this example, a center point of the first electromagnetic wave shielding filter 515 and a center point of the second electromagnetic wave shielding filter 516 may be located on the first transmitting coil 13. A center point of the third electromagnetic wave shielding filter 517 and a center point of the fourth electromagnetic wave shielding filter 518 may be located on the second transmitting coil 14.

Figure 5D:
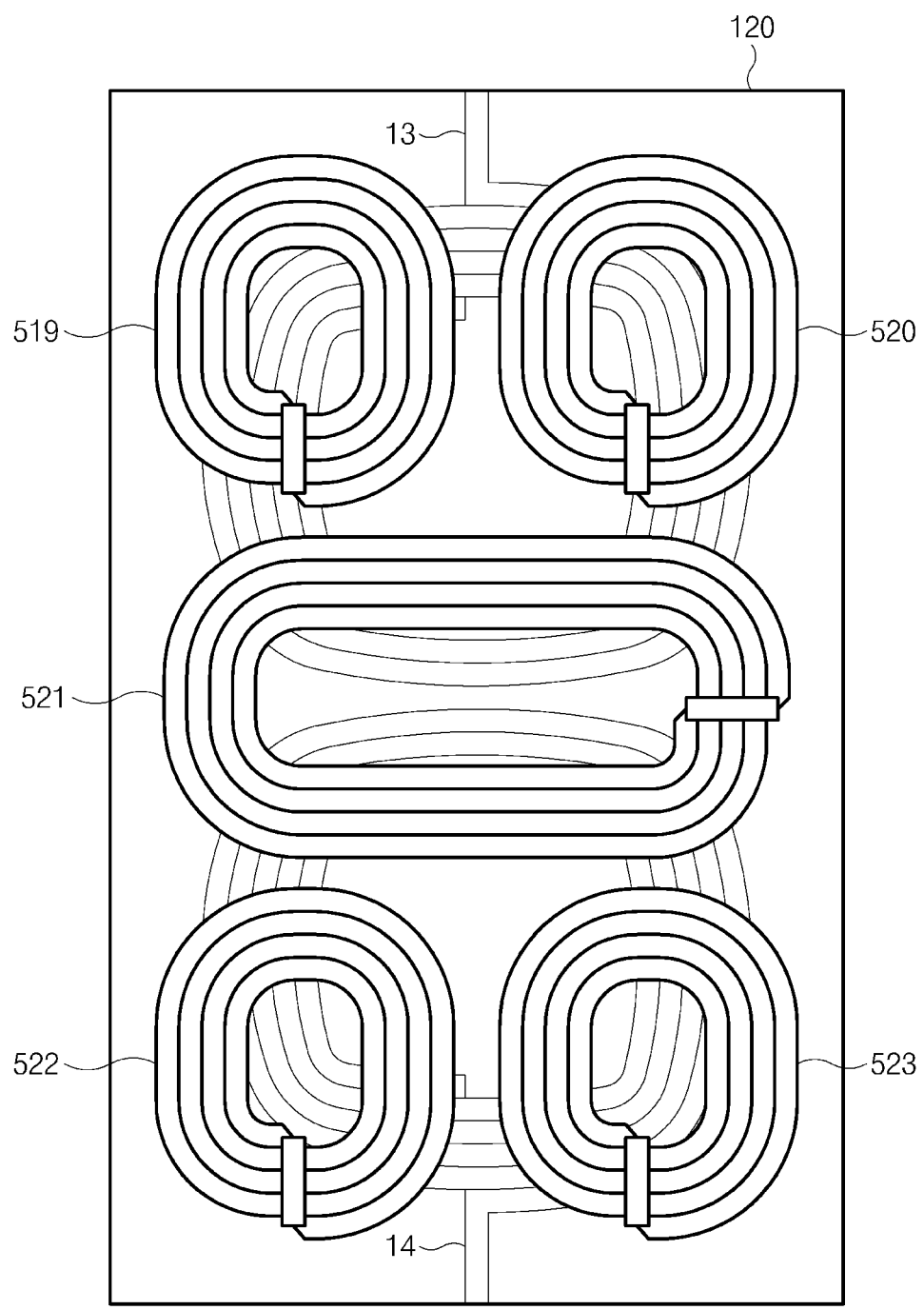

FIG. 5D illustrates an example including a first electromagnetic wave shielding filter 519, a second electromagnetic wave shielding filter 520, a third electromagnetic wave shielding filter 521, a fourth electromagnetic wave shielding filter 522, and a fifth electromagnetic wave shielding filter 523. In this example, the first electromagnetic wave shielding filter 519, the second electromagnetic wave shielding filter 520, the fourth electromagnetic wave shielding filter 522, and the fifth electromagnetic wave shielding filter 523 may have the same structure.

As illustrated in FIG. 5D, the first electromagnetic wave shielding filter 519 may be located on the upper left side of the first transmitting coil 13 and the second electromagnetic wave shielding filter 520 may be located on the upper right side of the first transmitting coil 13. The third electromagnetic wave shielding filter 521 may be located on the first transmitting coil 13 and the second transmitting coil 14. The fourth electromagnetic wave shielding filter 522 may be located on the lower left side of the second transmitting coil 14 and the fifth electromagnetic wave shielding filter 523 may be located on the lower right side of the second transmitting coil 14. In this example, a center point of the first electromagnetic wave shielding filter 519 and a center point of the second electromagnetic wave shielding filter 520 may be located on the first transmitting coil 13. A center point of the third electromagnetic wave shielding filter 521 may be located on the first transmitting coil 13 or the second transmitting coil 14. A center point of the fourth electromagnetic wave shielding filter 522 and a center point of the fifth electromagnetic wave shielding filter 523 may be located on the second transmitting coil 14.

Figure 5E:
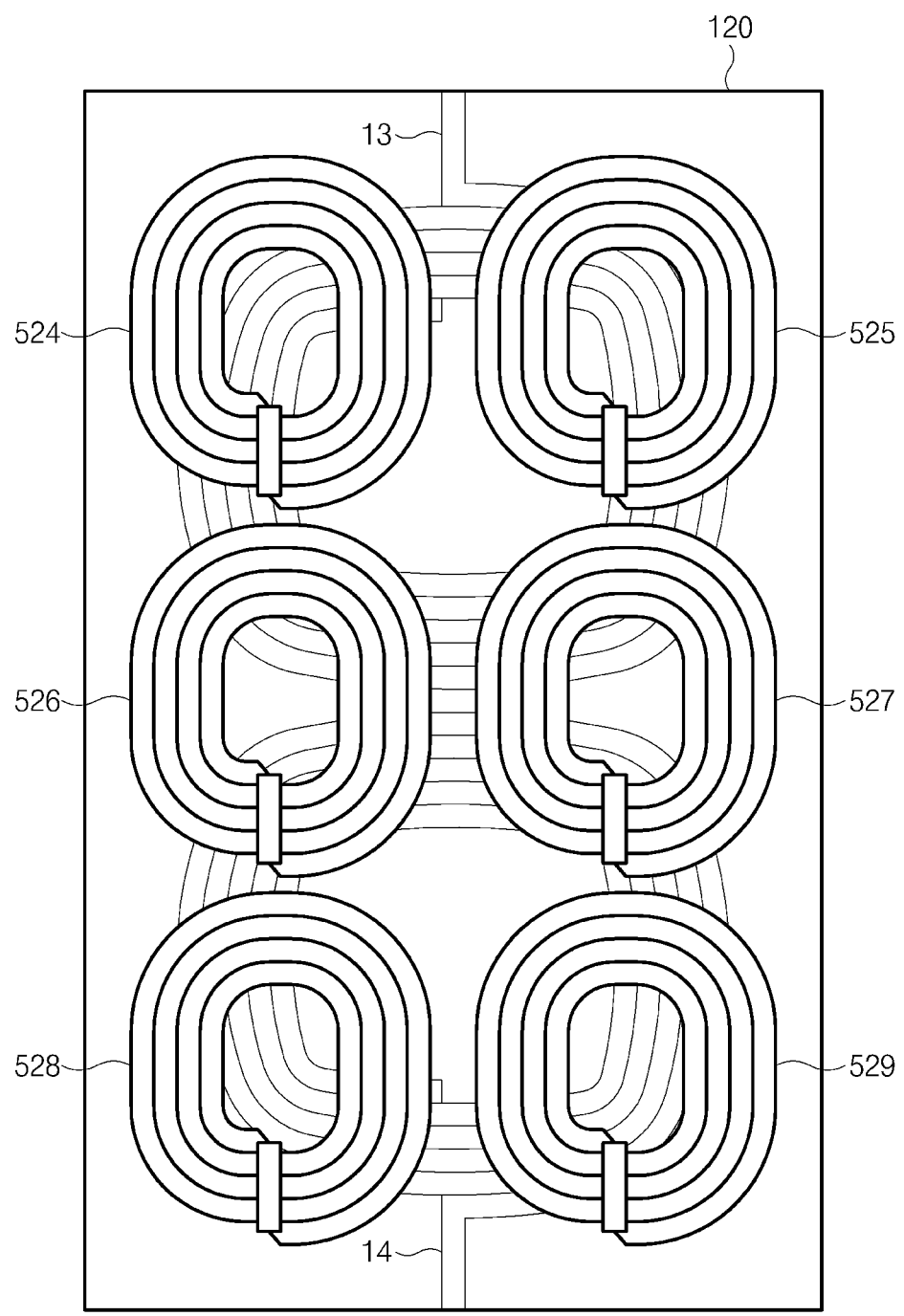

FIG. 5E illustrates an example including a first electromagnetic wave shielding filter 524, a second electromagnetic wave shielding filter 525, a third electromagnetic wave shielding filter 526, a fourth electromagnetic wave shielding filter 527, a fifth electromagnetic wave shielding filter 528, and a sixth electromagnetic wave shielding filter 529. In this example, the first electromagnetic wave shielding filter 524, the second electromagnetic wave shielding filter 525, the third electromagnetic wave shielding filter 526, the fourth electromagnetic wave shielding filter 527, the fifth electromagnetic wave shielding filter 528, and the sixth electromagnetic wave shielding filter 529 may have the same structure.

As illustrated in FIG. 5E, the first electromagnetic wave shielding filter 524 may be located on the upper left side of the first transmitting coil 13 and the second electromagnetic wave shielding filter 525 may be located on the upper right side of the first transmitting coil 13. The third electromagnetic wave shielding filter 526 may be located on the left side of the first transmitting coil 13 and the second transmitting coil 14. The fourth electromagnetic wave shielding filter 527 may be located on the right side of the first transmitting coil 13 and the second transmitting coil 14. The fifth electromagnetic wave shielding filter 528 may be located on the lower left side of the second transmitting coil 14 and the sixth electromagnetic wave shielding filter 529 may be located on the lower right side of the second transmitting coil 14. In this example, a center point of the first electromagnetic wave shielding filter 524 and a center point of the second electromagnetic wave shielding filter 525 may be located on the first transmitting coil 13. A center point of the third electromagnetic wave shielding filter 526 and a center point of the fourth electromagnetic wave shielding filter 527 may not be located on the first transmitting coil 13 or the second transmitting coil 14. A center point of the fifth electromagnetic wave shielding filter 528 and a center point of the sixth electromagnetic wave shielding filter 529 may be located on the second transmitting coil 14.

Figure 5F:
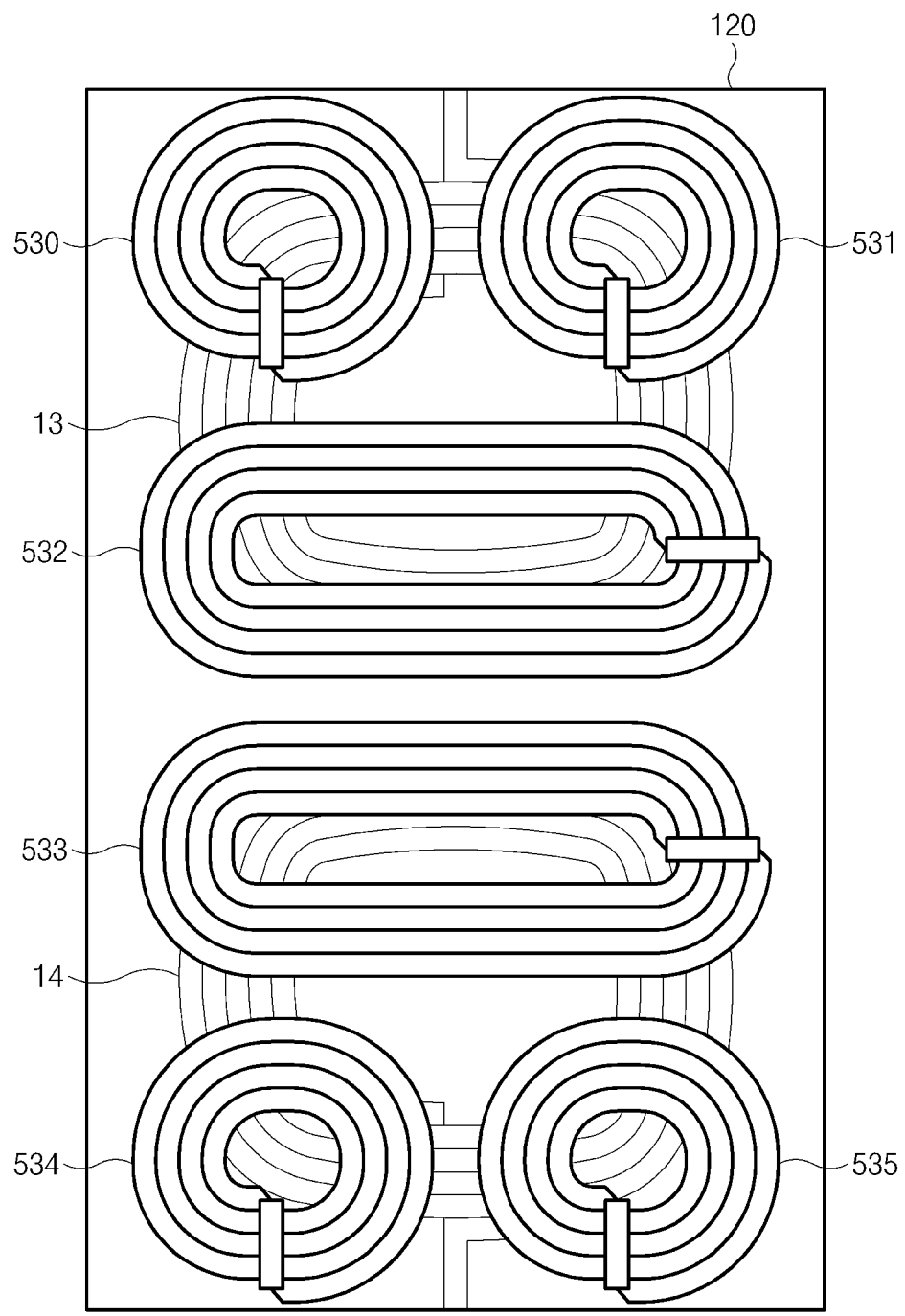

FIG. 5F illustrates an example including a first electromagnetic wave shielding filter 530, a second electromagnetic wave shielding filter 531, a third electromagnetic wave shielding filter 532, a fourth electromagnetic wave shielding filter 533, a fifth electromagnetic wave shielding filter 534, and a sixth electromagnetic wave shielding filter 535. In this example, the first electromagnetic wave shielding filter 530, the second electromagnetic wave shielding filter 531, the fifth electromagnetic wave shielding filter 534, and the sixth electromagnetic wave shielding filter 535 may have the same structure. The third electromagnetic wave shielding filter 532 and the fourth electromagnetic wave shielding filter 533 may have the same structure.

As illustrated in FIG. 5F, the first electromagnetic wave shielding filter 530 may be located on the upper left side of the first transmitting coil 13 and the second electromagnetic wave shielding filter 531 may be located on the upper right side of the first transmitting coil 13. The third electromagnetic wave shielding filter 532 may be located on the lower end of the first transmitting coil 13. The fourth electromagnetic wave shielding filter 533 may be located on the upper end of the second transmitting coil 14. The fifth electromagnetic wave shielding filter 534 may be located on the lower left side of the second transmitting coil 14. The sixth electromagnetic wave shielding filter 535 may be located on the lower right side of the second transmitting coil 14. In this example, a center point of the first electromagnetic wave shielding filter 530, a center point of the second electromagnetic wave shielding filter 531, and a center point of the third electromagnetic wave shielding filter 532 may be located on the first transmitting coil 13. A center point of the fourth electromagnetic wave shielding filter 533, a center point of the fifth electromagnetic wave shielding filter 534, and a center point of the sixth electromagnetic wave shielding filter 535 may be located on the second transmitting coil 14.

Figure 5G:
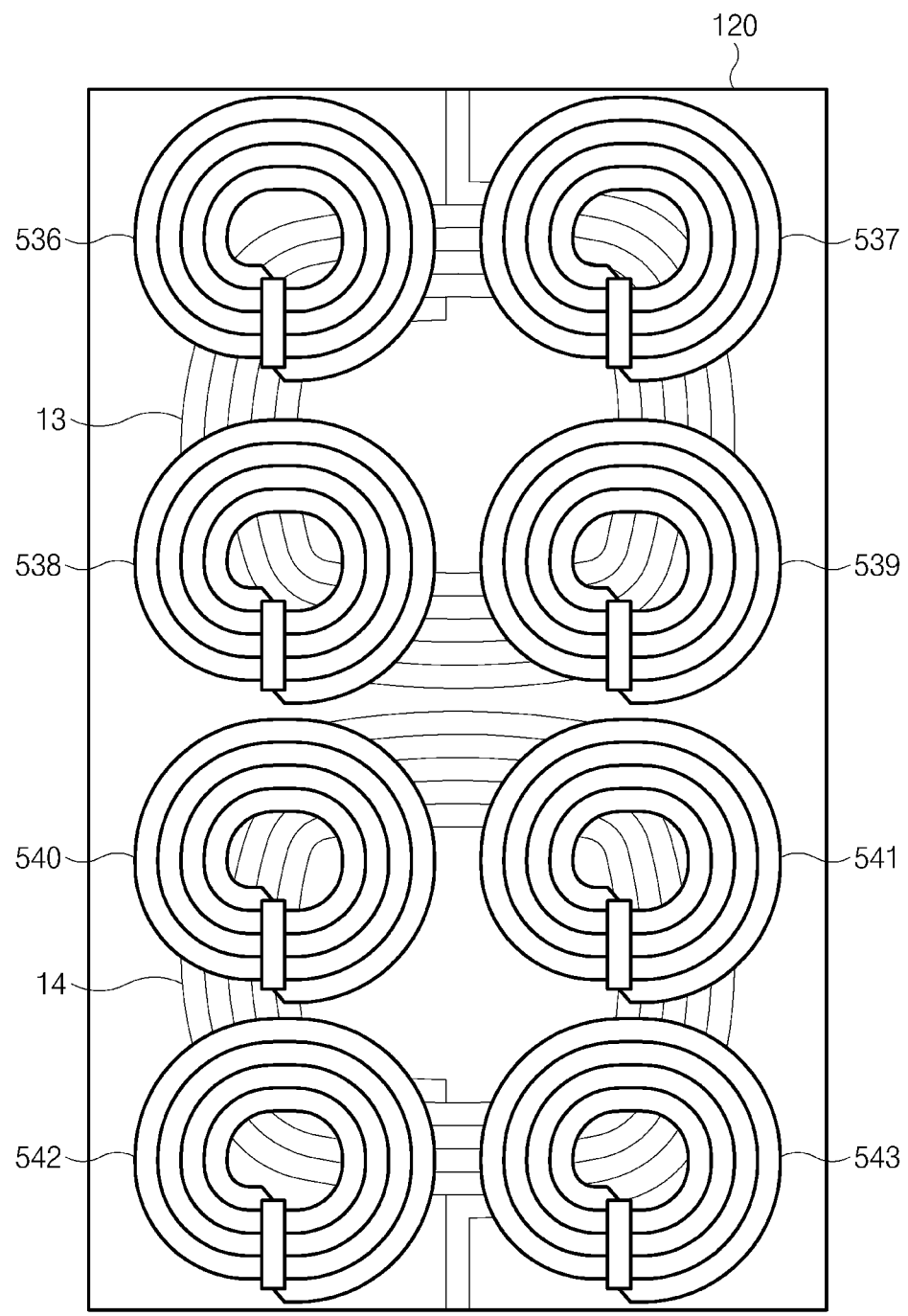

FIG. 5G illustrates an example including a first electromagnetic wave shielding filter 536, a second electromagnetic wave shielding filter 537, a third electromagnetic wave shielding filter 538, a fourth electromagnetic wave shielding filter 539, a fifth electromagnetic wave shielding filter 540, a sixth electromagnetic wave shielding filter 541, a seventh electromagnetic wave shielding filter 542, and an eighth electromagnetic wave shielding filter 543. In this example, the first electromagnetic wave shielding filter 536, the second electromagnetic wave shielding filter 537, the third electromagnetic wave shielding filter 538, the fourth electromagnetic wave shielding filter 539, the fifth electromagnetic wave shielding filter 540, the sixth electromagnetic wave shielding filter 541, the seventh electromagnetic wave shielding filter 542, and the eighth electromagnetic wave shielding filter 543 may have the same structure.

As illustrated in FIG. 5G, the first electromagnetic wave shielding filter 536 may be located on the upper left side of the first transmitting coil 13 and the second electromagnetic wave shielding filter 537 may be located on the upper right side of the first transmitting coil 13. The third electromagnetic wave shielding filter 538 may be located on the lower left side of the first transmitting coil 13 and the fourth electromagnetic wave shielding filter 539 may be located on the lower right side of the first transmitting coil 13. The fifth electromagnetic wave shielding filter 540 may be located on the upper left side of the second transmitting coil 14 and the sixth electromagnetic wave shielding filter 541 may be located on the upper right side of the second transmitting coil 14. The seventh electromagnetic wave shielding filter 542 may be located on the lower left side of the second transmitting coil 14 and the eighth electromagnetic wave shielding filter 543 may be located on the lower right side of the second transmitting coil 14. In this example, a center point of the first electromagnetic wave shielding filter 536, a center point of the second electromagnetic wave shielding filter 537, a center point of the third electromagnetic wave shielding filter 538, and a center point of the fourth electromagnetic wave shielding filter 539 may be located on the first transmitting coil 13. A center point of the fifth electromagnetic wave shielding filter 540, a center point of the sixth electromagnetic wave shielding filter 541, a center point of the seventh electromagnetic wave shielding filter 542, and a center point of the eighth electromagnetic wave shielding filter 543 may be located on the second transmitting coil 14.

FIGS. 6A-6I illustrate examples of structures of a wireless charger 120 having an electromagnetic shielding function according to another embodiment of the present disclosure. When the wireless charger 120 includes three transmitting coils 15, 16, and 17, optimal locations of respective electromagnetic wave shielding filters 610 to 652 are illustrated in FIGS. 6A to 6I.

Hereinafter, a first transmitting coil 15 and a second transmitting coil 16 may be located on the same plane (the same layer). A third transmitting coil 17 may be located on a layer higher than that of the first transmitting coil 15. Additionally, in one example, the electromagnetic wave shielding filters 610 to 652 may be located at the same height with respect to the first transmitting coil 15, and the height may be within 10 mm. Additionally, each of the electromagnetic wave shielding filters 610 to 652 may have any shape as long as it has an inductance.

Figure 6A:
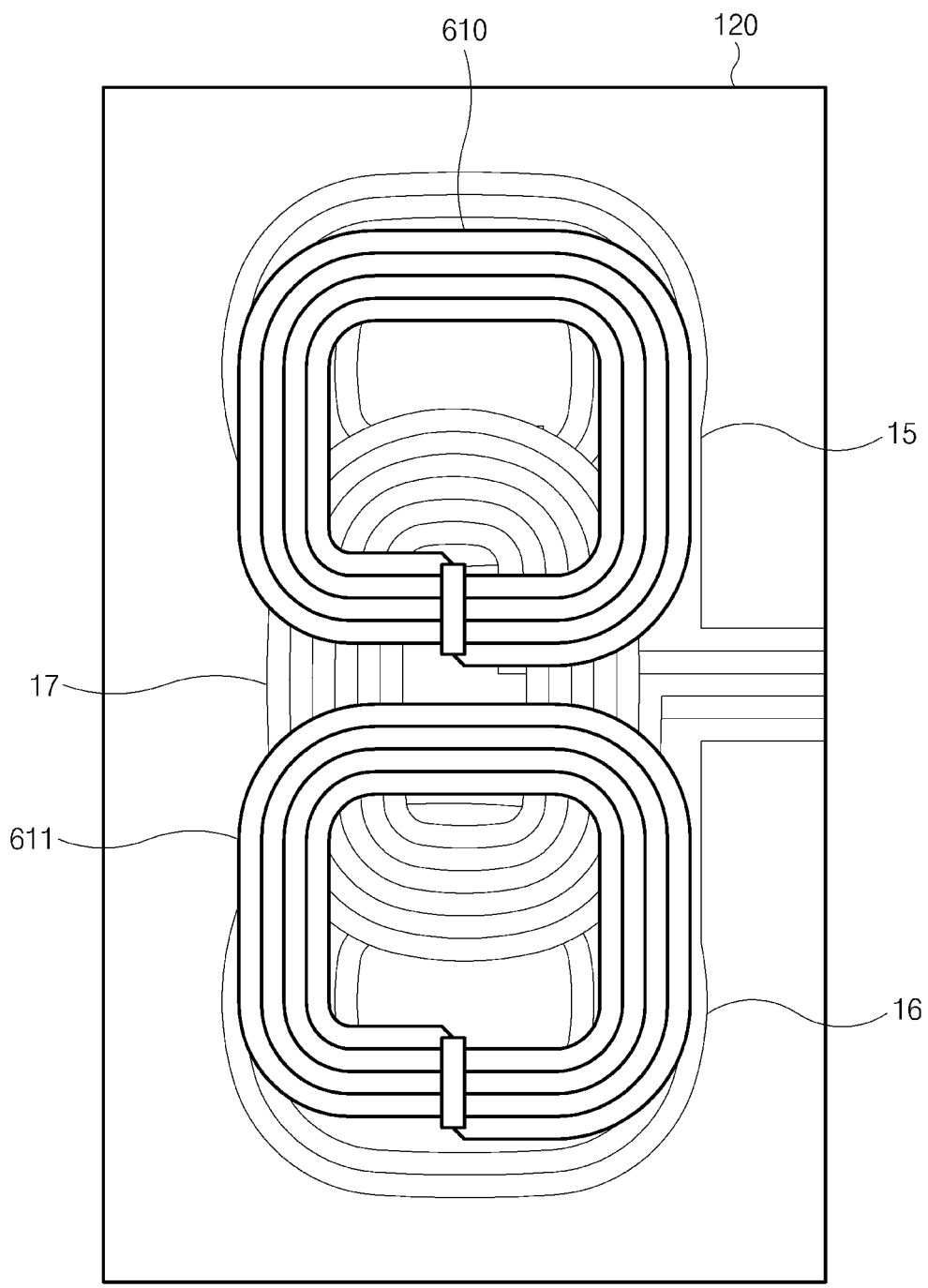

FIG. 6A illustrates an example including a first electromagnetic wave shielding filter 610 and a second electromagnetic wave shielding filter 611. In this example, the first electromagnetic wave shielding filter 610 and the second electromagnetic wave shielding filter 611 may have the same structure.

As illustrated in FIG. 6A, the first electromagnetic wave shielding filter 610 may be located on the third transmitting coil 17 to be overlapped with the first transmitting coil 15. The second electromagnetic wave shielding filter 611 may be located on the third transmitting coil 17 to be overlapped with the second transmitting coil 16. In this example, a center point of the first electromagnetic wave shielding filter 610 and a center point of the second electromagnetic wave shielding filter 611 may be located on the third transmitting coil 17.

Figure 6B:
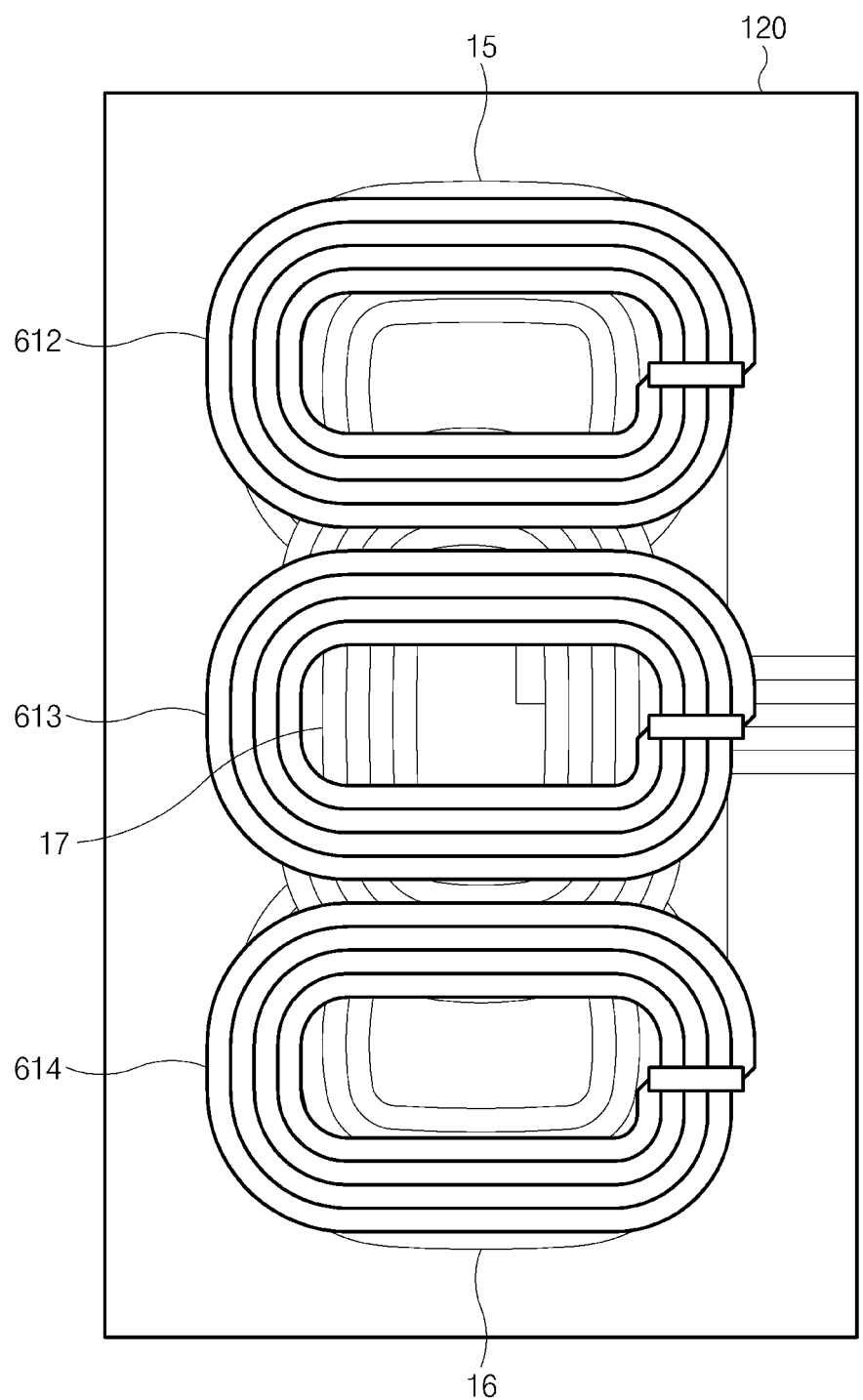

FIG. 6B illustrates an example including a first electromagnetic wave shielding filter 612, a second electromagnetic wave shielding filter 613, and a third electromagnetic wave shielding filter 614. In this example, the first electromagnetic wave shielding filter 612, the second electromagnetic wave shielding filter 613, and the third electromagnetic wave shielding filter 614 may have the same structure.

As illustrated in FIG. 6B, the first electromagnetic wave shielding filter 612 may be located on the upper end of the first transmitting coil 15, the second electromagnetic wave shielding filter 613 may be located on the third transmitting coil 17, and the third electromagnetic wave shielding filter 614 may be located on the lower end of the second transmitting coil 16. In this example, a center point of the first electromagnetic wave shielding filter 612 may not be located on the first transmitting coil 15. A center point of the second electromagnetic wave shielding filter 613 may not be located on the third transmitting coil 17. A center point of the third electromagnetic wave shielding filter 614 may not be located on the second transmitting coil 16.

Figure 6C:
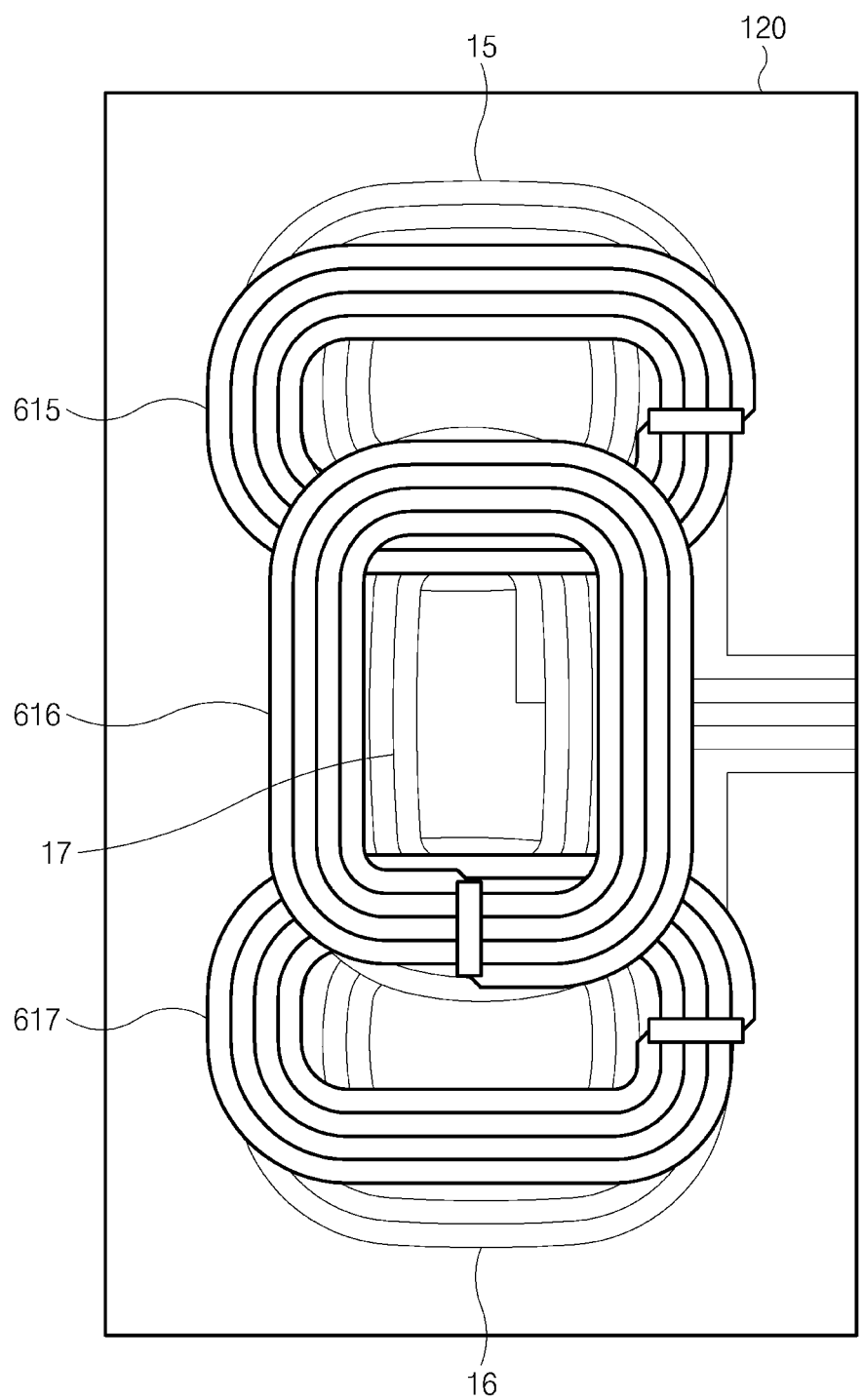

FIG. 6C illustrates an example including a first electromagnetic wave shielding filter 615, a second electromagnetic wave shielding filter 616, and a third electromagnetic wave shielding filter 617. In this example, the first electromagnetic wave shielding filter 615, the second electromagnetic wave shielding filter 616, and the third electromagnetic wave shielding filter 617 may have the same structure.

As illustrated in FIG. 6C, the first electromagnetic wave shielding filter 615 may be located on the third transmitting coil 17 to be overlapped with the first transmitting coil 15. The second electromagnetic wave shielding filter 616 may be located on the third transmitting coil 17 to be overlapped with the third transmitting coil 17. The third electromagnetic wave shielding filter 617 may be located on the third transmitting coil 17 to be overlapped with the second transmitting coil 16. In this example, a center point of the first electromagnetic wave shielding filter 615 may not be located on the first transmitting coil 15. A center point of the second electromagnetic wave shielding filter 616 may not be located on the third transmitting coil 17. A center point of the third electromagnetic wave shielding filter 617 may not be located on the second transmitting coil 16. Additionally, the first electromagnetic wave shielding filter 615 and the third electromagnetic wave shielding filter 617 may be located on the same layer. The second electromagnetic wave shielding filter 616 may be located on a layer disposed higher than that of the first electromagnetic wave shielding filter 615.

Figure 6D:
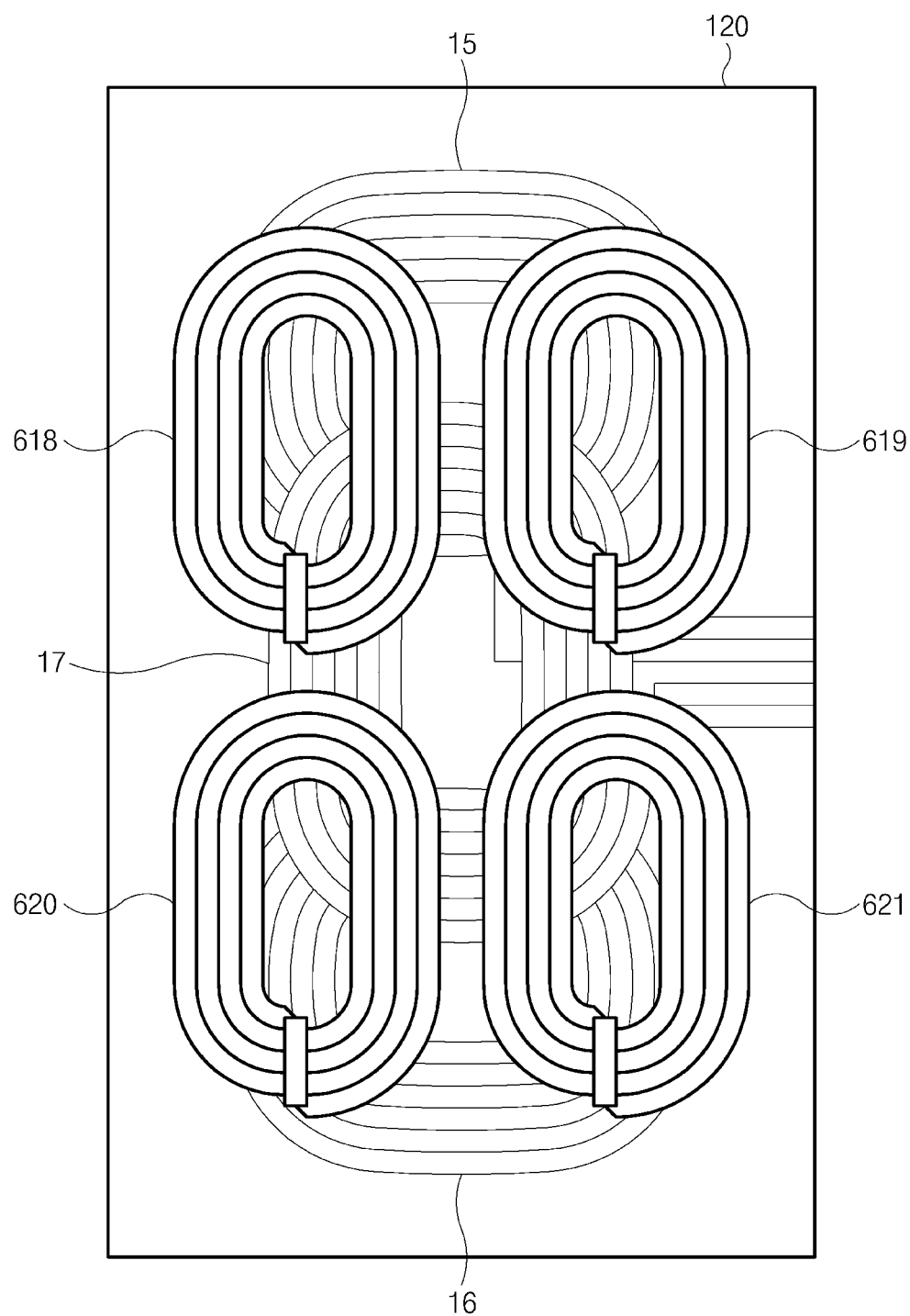

FIG. 6D illustrates an example including a first electromagnetic wave shielding filter 618, a second electromagnetic wave shielding filter 619, a third electromagnetic wave shielding filter 620, and a fourth electromagnetic wave shielding filter 621. In this example, the first electromagnetic wave shielding filter 618, the second electromagnetic wave shielding filter 619, the third electromagnetic wave shielding filter 620, and the fourth electromagnetic wave shielding filter 621 may have the same structure.

As illustrated in FIG. 6D, the first electromagnetic wave shielding filter 618 may be located on the left side of the first transmitting coil 15 and the second electromagnetic wave shielding filter 619 may be located on the right side of the first transmitting coil 15. The third electromagnetic wave shielding filter 620 may be located on the left side of the second transmitting coil 16 and the fourth electromagnetic wave shielding filter 621 may be located on the right side of the second transmitting coil 16. In this example, a center point of the first electromagnetic wave shielding filter 618 and a center point of the second electromagnetic wave shielding filter 619 may be located on the first transmitting coil 15. A center point of the third electromagnetic wave shielding filter 620 and a center point of the fourth electromagnetic wave shielding filter 621 may be located on the second transmitting coil 16.

Figure 6E:
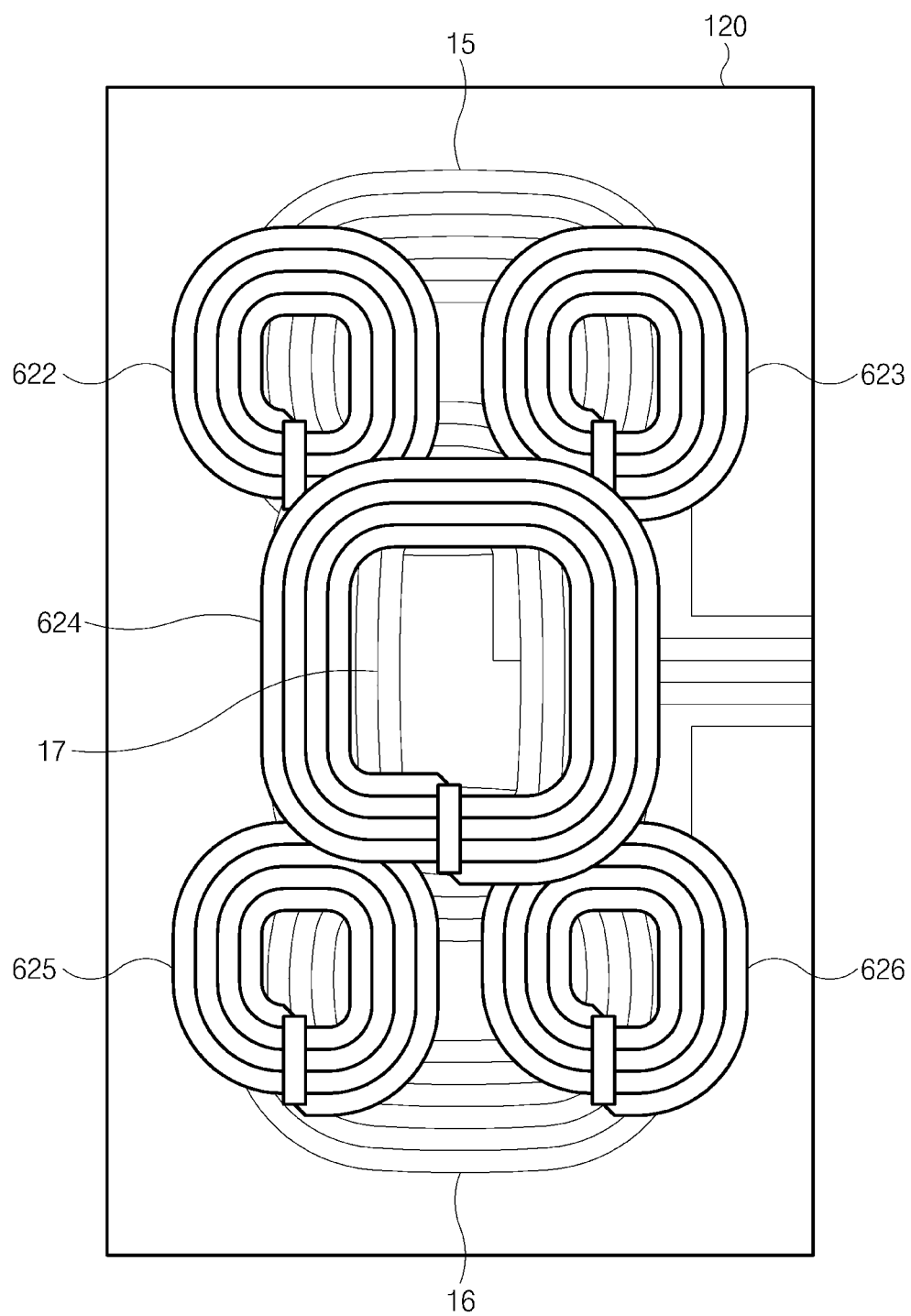

FIG. 6E illustrates an example including a first electromagnetic wave shielding filter 622, a second electromagnetic wave shielding filter 623, a third electromagnetic wave shielding filter 624, a fourth electromagnetic wave shielding filter 625, and a fifth electromagnetic wave shielding filter 626. In this example, the first electromagnetic wave shielding filter 622, the second electromagnetic wave shielding filter 623, the fourth electromagnetic wave shielding filter 625, and the fifth electromagnetic wave shielding filter 626 may have the same structure.

As illustrated in FIG. 6E, the first electromagnetic wave shielding filter 622 may be located on the upper left side of the first transmitting coil 15 and the second electromagnetic wave shielding filter 623 may be located on the upper right side of the first transmitting coil 15. The third electromagnetic wave shielding filter 624 may be overlapped with the third transmitting coil 17. The fourth electromagnetic wave shielding filter 625 may be located on the lower left side of the second transmitting coil 16 and the fifth electromagnetic wave shielding filter 626 may be located on the lower right side of the second transmitting coil 16. In this example, a center point of the first electromagnetic wave shielding filter 622 and a center point of the second electromagnetic wave shielding filter 623 may be located on the first transmitting coil 15. A center point of the third electromagnetic wave shielding filter 624 may not be located on the first transmitting coil 15 and the second transmitting coil 16. A center point of the fourth electromagnetic wave shielding filter 625 and a center point of the fifth electromagnetic wave shielding filter 626 may be located on the second transmitting coil 16.

Figure 6F:
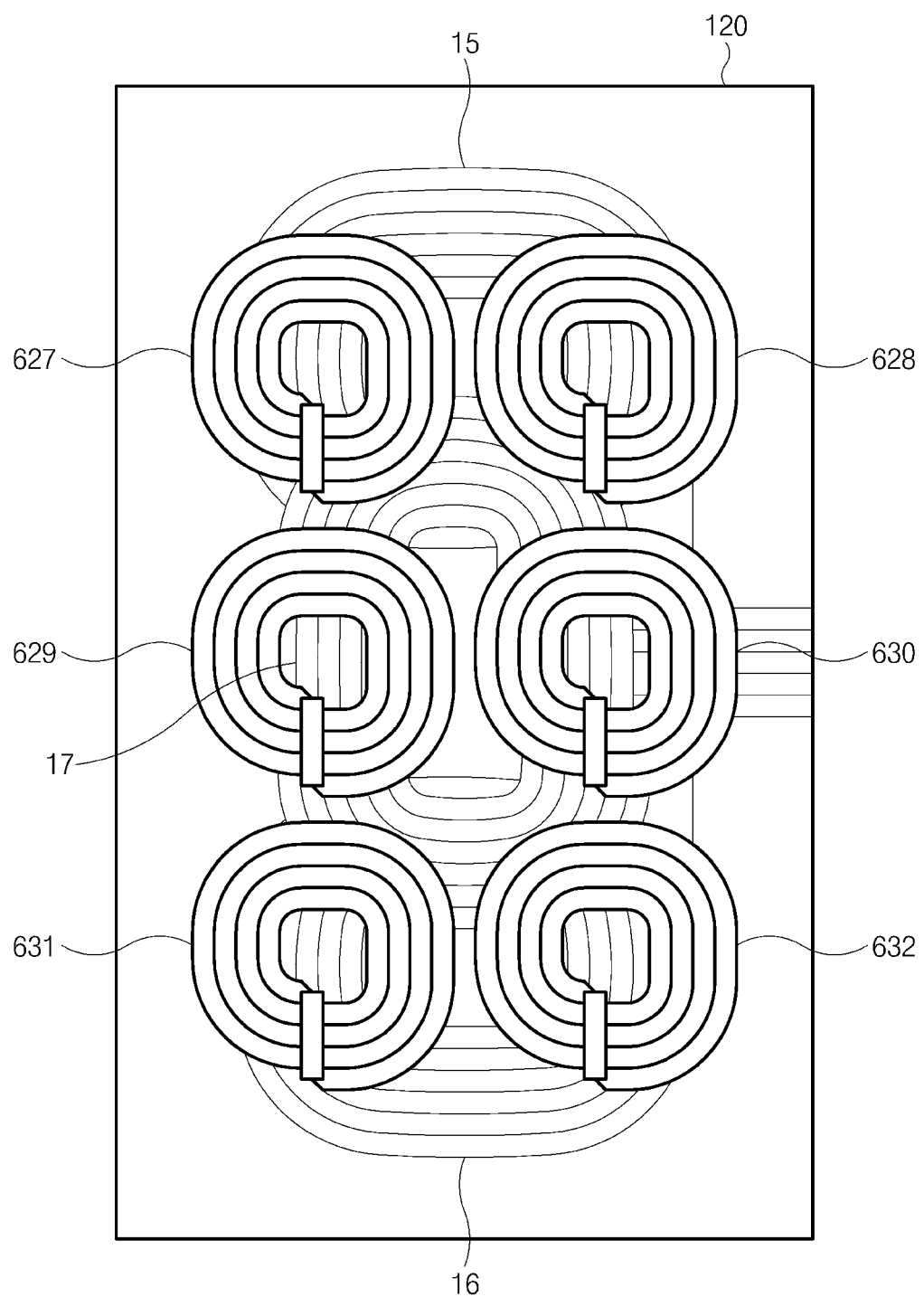

FIG. 6F illustrates an example including a first electromagnetic wave shielding filter 627, a second electromagnetic wave shielding filter 628, a third electromagnetic wave shielding filter 629, a fourth electromagnetic wave shielding filter 630, a fifth electromagnetic wave shielding filter 631, and a sixth electromagnetic wave shielding filter 632. In this example, the first electromagnetic wave shielding filter 627, the second electromagnetic wave shielding filter 628, the third electromagnetic wave shielding filter 629, the fourth electromagnetic wave shielding filter 630, the fifth electromagnetic wave shielding filter 631, and the sixth electromagnetic wave shielding filter 632 may have the same structure.

As illustrated in FIG. 6F, the first electromagnetic wave shielding filter 627 may be located on the upper left side of the first transmitting coil 15 and the second electromagnetic wave shielding filter 628 may be located on the upper right side of the first transmitting coil 15. The third electromagnetic wave shielding filter 629 may be located on the left side of the third transmitting coil 17 and the fourth electromagnetic wave shielding filter 630 may be located on the right side of the third transmitting coil 17. The fifth electromagnetic wave shielding filter 631 may be located on the lower left side of the second transmitting coil 16 and the sixth electromagnetic wave shielding filter 632 may be located on the lower right side of the second transmitting coil 16. In this example, a center point of the first electromagnetic wave shielding filter 627 and a center point of the second electromagnetic wave shielding filter 628 may be located on the first transmitting coil 15. A center point of the third electromagnetic wave shielding filter 629 and a center point of the fourth electromagnetic wave shielding filter 630 may be located on the third transmitting coil 17. A center point of the fifth electromagnetic wave shielding filter 631 and a center point of the sixth electromagnetic wave shielding filter 632 may be located on the second transmitting coil 16.

Figure 6G:
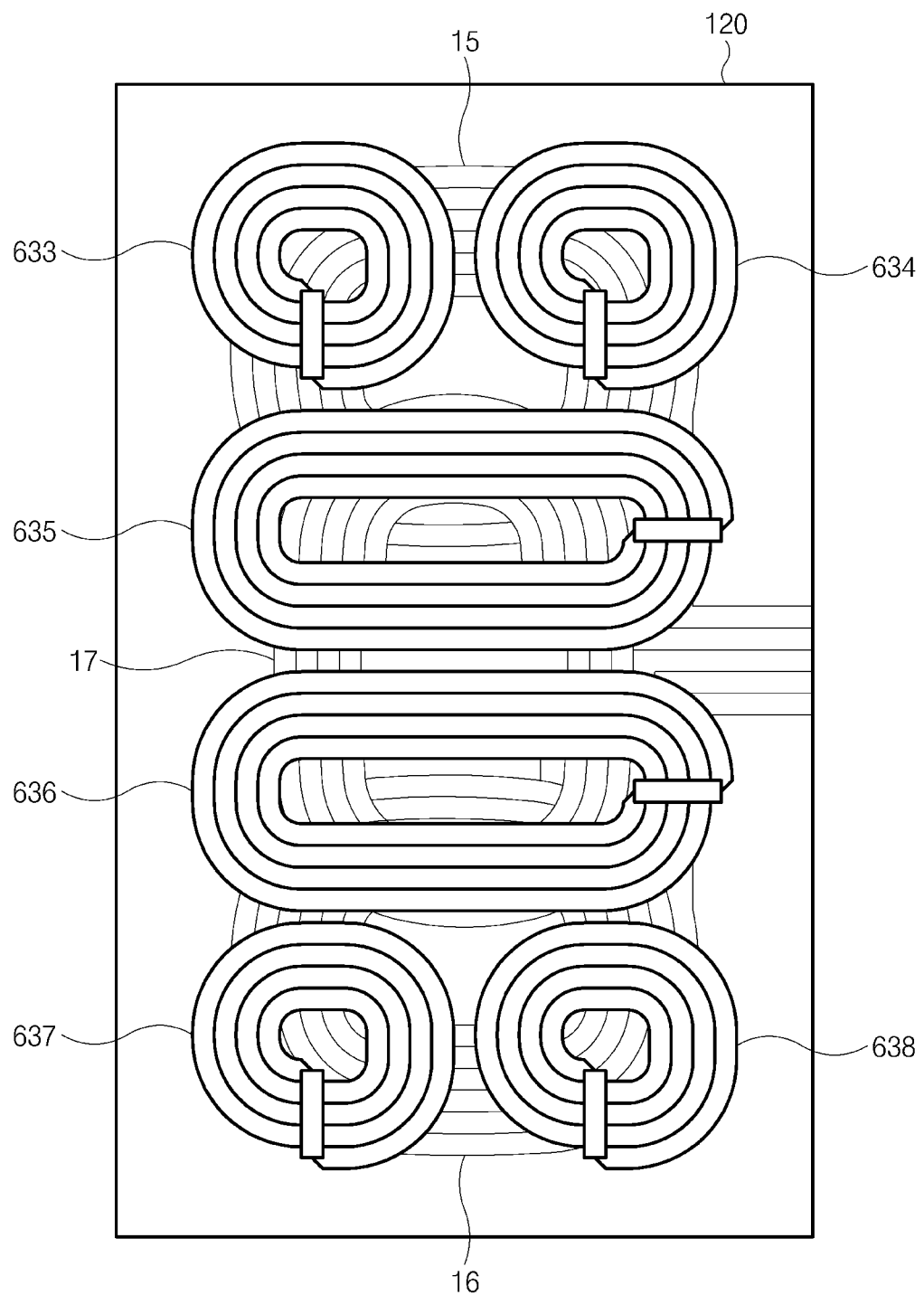

FIG. 6G illustrates an example including a first electromagnetic wave shielding filter 633, a second electromagnetic wave shielding filter 634, a third electromagnetic wave shielding filter 635, a fourth electromagnetic wave shielding filter 636, a fifth electromagnetic wave shielding filter 637, and a sixth electromagnetic wave shielding filter 638. In this example, the first electromagnetic wave shielding filter 633, the second electromagnetic wave shielding filter 634, the fifth electromagnetic wave shielding filter 637, and the sixth electromagnetic wave shielding filter 638 may have the same structure. The third electromagnetic wave shielding filter 635 and the fourth electromagnetic wave shielding filter 636 may have the same structure.

As illustrated in FIG. 6G, the first electromagnetic wave shielding filter 633 may be located on the upper left side of the first transmitting coil 15 and the second electromagnetic wave shielding filter 634 may be located on the upper right side of the first transmitting coil 15. The third electromagnetic wave shielding filter 635 may be located on the upper end of the third transmitting coil 17 and the fourth electromagnetic wave shielding filter 636 may be located on the lower end of the third transmitting coil 17. The fifth electromagnetic wave shielding filter 637 may be located on the lower left side of the second transmitting coil 16 and the sixth electromagnetic wave shielding filter 638 may be located on the lower right side of the second transmitting coil 16. In this example, a center point of the first electromagnetic wave shielding filter 633, a center point of the second electromagnetic wave shielding filter 634, and a center point of the third electromagnetic wave shielding filter 635 may be located on the first transmitting coil 15. A center point of the fourth electromagnetic wave shielding filter 636, a center point of the fifth electromagnetic wave shielding filter 637, and a center point of the sixth electromagnetic wave shielding filter 638 may be located on the second transmitting coil 16.

Figure 6H:
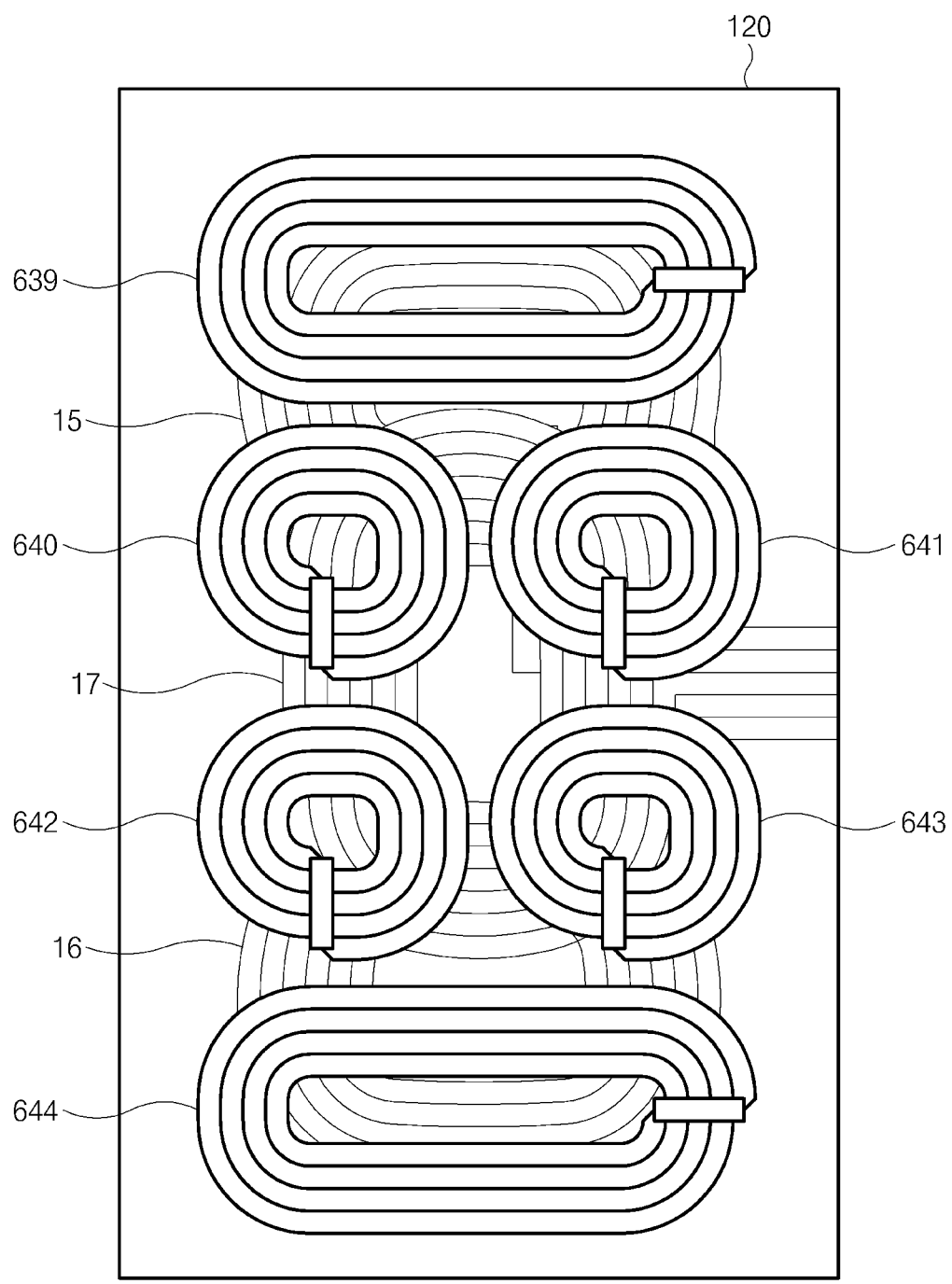
Figure 61:
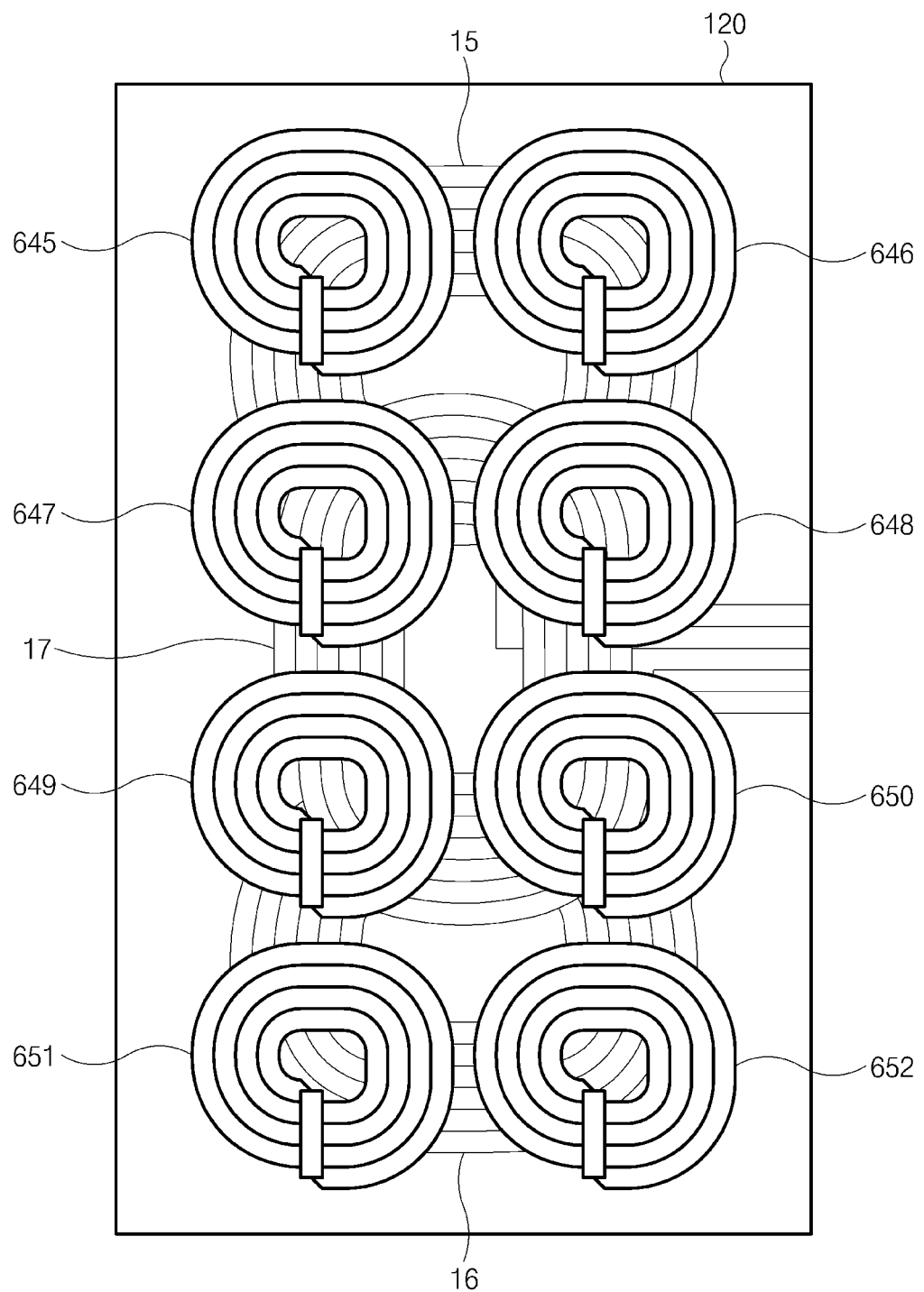

FIG. 6H illustrates an example including a first electromagnetic wave shielding filter 639, a second electromagnetic wave shielding filter 640, a third electromagnetic wave shielding filter 641, a fourth electromagnetic wave shielding filter 642, a fifth electromagnetic wave shielding filter 643, and a sixth electromagnetic wave shielding filter 644. In this example, the first electromagnetic wave shielding filter 639 and the sixth electromagnetic wave shielding filter 644 may have the same structure. The second electromagnetic wave shielding filter 640, the third electromagnetic wave shielding filter 641, the fourth electromagnetic wave shielding filter 642, and the fifth electromagnetic wave shielding filter 643 may have the same structure.

As illustrated in FIG. 6H, the first electromagnetic wave shielding filter 639 may be located on the upper end of the first transmitting coil 15. The second electromagnetic wave shielding filter 640 may be located on the upper left side of the third transmitting coil 17 and the third electromagnetic wave shielding filter 641 may be located on the upper right side of the third transmitting coil 17. The fourth electromagnetic wave shielding filter 642 may be located on the lower left side of the third transmitting coil 17 and the fifth electromagnetic wave shielding filter 643 may be located on the lower right side of the third transmitting coil 17. The sixth electromagnetic wave shielding filter 644 may be located on the lower end of the second transmitting coil 16. In this example, a center point of the first electromagnetic wave shielding filter 639 may be located on the first transmitting coil 15, a center point of the second electromagnetic wave shielding filter 640, a center point of the third electromagnetic wave shielding filter 641, a center point of the fourth electromagnetic wave shielding filter 642, and a center point of the fifth electromagnetic wave shielding filter 643 may be located on the third transmitting coil 17. A center point of the sixth electromagnetic wave shielding filter 644 may be located on the second transmitting coil 16.

FIG. 6I illustrates an example including a first electromagnetic wave shielding filter 645, a second electromagnetic wave shielding filter 646, a third electromagnetic wave shielding filter 647, a fourth electromagnetic wave shielding filter 648, a fifth electromagnetic wave shielding filter 649, a sixth electromagnetic wave shielding filter 650, a seventh electromagnetic wave shielding filter 651, and an eighth electromagnetic wave shielding filter 652. In this example, the first electromagnetic wave shielding filter 645, the second electromagnetic wave shielding filter 646, the third electromagnetic wave shielding filter 647, the fourth electromagnetic wave shielding filter 648, the fifth electromagnetic wave shielding filter 649, the sixth electromagnetic wave shielding filter 650, the seventh electromagnetic wave shielding filter 651, and the eighth electromagnetic wave shielding filter 652 may have the same structure.

As illustrated in FIG. 6I, the first electromagnetic wave shielding filter 645 may be located on the upper left side of the first transmitting coil 15 and the second electromagnetic wave shielding filter 646 may be located on the upper right side of the first transmitting coil 15. The third electromagnetic wave shielding filter 647 may be located on the upper left side of the third transmitting coil 17 and the fourth electromagnetic wave shielding filter 648 may be located on the upper right side of the third transmitting coil 17. The fifth electromagnetic wave shielding filter 649 may be located on the lower left side of the third transmitting coil 17 and the sixth electromagnetic wave shielding filter 650 may be located on the lower right side of the third transmitting coil 17. The seventh electromagnetic wave shielding filter 651 may be located on the lower left side of the second transmitting coil 16 and the eighth electromagnetic wave shielding filter 652 may be located on the lower right side of the second transmitting coil 16. In this example, a center point of the first electromagnetic wave shielding filter 645 and a center point of the second electromagnetic wave shielding filter 646 may be located on the first transmitting coil 15. A center point of the third electromagnetic wave shielding filter 647, a center point of the fourth electromagnetic wave shielding filter 648, a center point of the fifth electromagnetic wave shielding filter 649, and a center point of the sixth electromagnetic wave shielding filter 650 may be located on the third transmitting coil 17. A center point of the seventh electromagnetic wave shielding filter 651 and a center point of the eighth electromagnetic wave shielding filter 652 may be located on the second transmitting coil 16.

As set forth above, by mounting at least two electromagnetic wave shielding filters in specific locations on the transmitting coil, the electromagnetic waves generated in the transmitting coil of the wireless charger may be efficiently shielded.

Additionally, by efficiently shielding the electromagnetic waves generated in the transmitting coil of the wireless charger, the charging efficiency of the wireless charger may be improved.

Furthermore, by mounting at least two electromagnetic wave shielding filters in specific locations on the transmitting coil, radio frequency interference (RFI) in an amplitude modulation (AM) band may be reduced.

Hereinabove, although the present disclosure has been described with reference to embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A wireless charger having an electromagnetic shielding function, comprising:
    a transmitting coil generating a magnetic field by a high frequency signal; and
    at least two electromagnetic wave shielding filters located on the transmitting coil and shielding electromagnetic waves generated in the transmitting coil,
    wherein when there are a first electromagnetic wave shielding filter and a second electromagnetic wave shielding filter, the first and second electromagnetic wave shielding filters have the same structure,
    wherein the first electromagnetic wave shielding filter is located on a left side of the transmitting coil, and
    wherein the second electromagnetic wave shielding filter is located on a right side of the transmitting coil.

2. A wireless charger having an electromagnetic shielding function, comprising:
    a transmitting coil generating a magnetic field by a high frequency signal; and
    at least two electromagnetic wave shielding filters located on the transmitting coil and shielding electromagnetic waves generated in the transmitting coil,
    wherein when there are a first electromagnetic wave shielding filter and a second electromagnetic wave shielding filter, the first and second electromagnetic wave shielding filters have the same structure,
    wherein the first electromagnetic wave shielding filter is located on an upper end of the transmitting coil, and
    wherein the second electromagnetic wave shielding filter is located on a lower end of the transmitting coil.

3. A wireless charger having an electromagnetic shielding function, comprising:
    a transmitting coil generating a magnetic field by a high frequency signal; and
    at least two electromagnetic wave shielding filters located on the transmitting coil and shielding electromagnetic waves generated in the transmitting coil,
    wherein when there are a first electromagnetic wave shielding filter, a second electromagnetic wave shielding filter, a third electromagnetic wave shielding filter, and a fourth electromagnetic wave shielding filter, the first, second, third, and fourth electromagnetic wave shielding filters have the same structure,
    wherein the first electromagnetic wave shielding filter is located on an upper left side of the transmitting coil,
    wherein the second electromagnetic wave shielding filter is located on an upper right side of the transmitting coil,
    wherein the third electromagnetic wave shielding filter is located on a lower left side of the transmitting coil, and
    wherein the fourth electromagnetic wave shielding filter is located on a lower right side of the transmitting coil.

4. A wireless charger having an electromagnetic shielding function, comprising:
    a transmitting coil generating a magnetic field by a high frequency signal; and
    at least two electromagnetic wave shielding filters located on the transmitting coil and shielding electromagnetic waves generated in the transmitting coil,
    wherein when there are a first electromagnetic wave shielding filter, a second electromagnetic wave shielding filter, a third electromagnetic wave shielding filter, and a fourth electromagnetic wave shielding filter, the first, second, third, and fourth electromagnetic wave shielding filters have the same structure,
    wherein the first electromagnetic wave shielding filter is located on an upper end of the transmitting coil,
    wherein the second electromagnetic wave shielding filter is located on a left side of the transmitting coil,
    wherein the third electromagnetic wave shielding filter is located on a right side of the transmitting coil, and
    wherein the fourth electromagnetic wave shielding filter is located on a lower end of the transmitting coil.

5. A wireless charger having an electromagnetic shielding function, comprising:
    a transmitting coil generating a magnetic field by a high frequency signal; and
    at least two electromagnetic wave shielding filters located on the transmitting coil and shielding electromagnetic waves generated in the transmitting coil,
    wherein the transmitting coil comprises a first transmitting coil, a second transmitting coil, and a third transmitting coil,
    wherein when there are a first electromagnetic wave shielding filter, a second electromagnetic wave shielding filter, a third electromagnetic wave shielding filter, a fourth electromagnetic wave shielding filter, a fifth electromagnetic wave shielding filter, and a sixth electromagnetic wave shielding filter, the first, second, fifth, and sixth electromagnetic wave shielding filters have the same structure, and the third and fourth electromagnetic wave shielding filters have the same structure, wherein the first electromagnetic wave shielding filter is located on an upper left side of the first transmitting coil, wherein the second electromagnetic wave shielding filter is located on an upper right side of the first transmitting coil, wherein the third electromagnetic wave shielding filter is located on an upper end of the third transmitting coil, wherein the fourth electromagnetic wave shielding filter is located on a lower end of the third transmitting coil, wherein the fifth electromagnetic wave shielding filter is located on a lower left side of the second transmitting coil, wherein the sixth electromagnetic wave shielding filter is located on a lower right side of the second transmitting coil, wherein a center point of the first electromagnetic wave shielding filter, a center point of the second electromagnetic wave shielding filter, and a center point of the third electromagnetic wave shielding filter are located on the first transmitting coil, and wherein a center point of the fourth electromagnetic wave shielding filter, a center point of the fifth electromagnetic wave shielding filter, and a center point of the sixth electromagnetic wave shielding filter are located on the second transmitting coil.

6. A wireless charger having an electromagnetic shielding function, comprising:

a transmitting coil generating a magnetic field by a high frequency signal; and at least two electromagnetic wave shielding filters located on the transmitting coil and shielding electromagnetic waves generated in the transmitting coil, wherein the transmitting coil comprises a first transmitting coil, a second transmitting coil, and a third transmitting coil, wherein when there are a first electromagnetic wave shielding filter, a second electromagnetic wave shielding filter, a third electromagnetic wave shielding filter, a fourth electromagnetic wave shielding filter, a fifth electromagnetic wave shielding filter, and a sixth electromagnetic wave shielding filter, the first and sixth electromagnetic wave shielding filters have the same structure, and the second, third, fourth, and fifth electromagnetic wave shielding filters have the same structure, wherein the first electromagnetic wave shielding filter is located on an upper end of the first transmitting coil, wherein the second electromagnetic wave shielding filter is located on an upper left side of the third transmitting coil, wherein the third electromagnetic wave shielding filter is located on an upper right side of the third transmitting coil, wherein the fourth electromagnetic wave shielding filter is located on a lower left side of the third transmitting coil, wherein the fifth electromagnetic wave shielding filter is located on a lower right side of the third transmitting coil, wherein the sixth electromagnetic wave shielding filter is located on a lower end of the second transmitting coil, wherein a center point of the first electromagnetic wave shielding filter is located on the first transmitting coil, wherein a center point of the second electromagnetic wave shielding filter, a center point of the third electromagnetic wave shielding filter, a center point of the fourth electromagnetic wave shielding filter, and a center point of the fifth electromagnetic wave shielding filter are located on the third transmitting coil, and wherein a center point of the sixth electromagnetic wave shielding filter is located on the second transmitting coil.

* * * * *